(12) United States Patent
Joodaki

(10) Patent No.: US 7,782,066 B2
(45) Date of Patent: Aug. 24, 2010

(54) SENSOR, METHOD FOR SENSING, MEASURING DEVICE, METHOD FOR MEASURING, FILTER COMPONENT, METHOD FOR ADAPTING A TRANSFER BEHAVIOR OF A FILTER COMPONENT, ACTUATOR SYSTEM AND METHOD FOR CONTROLLING AN ACTUATOR USING A SENSOR

(75) Inventor: Mojtaba Joodaki, Dresden (DE)

(73) Assignee: Qimonda AG, Munich (DE)

( * ) Notice: Subject to any disclaimer, the term of this patent is extended or adjusted under 35 U.S.C. 154(b) by 349 days.

(21) Appl. No.: 11/847,639

(22) Filed: Aug. 30, 2007

(65) Prior Publication Data

US 2009/0058562 A1    Mar. 5, 2009

(51) Int. Cl.
*G01R 23/04* (2006.01)
*G01R 27/28* (2006.01)
(52) U.S. Cl. .................... 324/637; 324/95; 324/615
(58) Field of Classification Search ............... 324/205, 324/95, 615, 637
See application file for complete search history.

(56) References Cited

U.S. PATENT DOCUMENTS

| 5,501,893 | A |   | 3/1996 | Laermer et al. |
|---|---|---|---|---|
| 5,958,505 | A |   | 9/1999 | Mantl |
| 6,049,726 | A | * | 4/2000 | Gruenwald et al. ......... 505/210 |
| 6,441,449 | B1 | * | 8/2002 | Xu et al. .................... 257/414 |
| 6,825,741 | B2 |   | 11/2004 | Chappell et al. |
| 6,876,877 | B2 | * | 4/2005 | Eden ........................ 505/210 |

FOREIGN PATENT DOCUMENTS

| DE | 195 03 641 A1 | 8/1996 |
|---|---|---|
| EP | 0 068 345 A1 | 1/1983 |
| EP | 0 205 570 B1 | 12/1986 |
| EP | 0 809 860 B1 | 12/1997 |
| EP | 1 193 215 A2 | 4/2002 |

(Continued)

OTHER PUBLICATIONS

Chappell, W.J., et al., "High Q Two Dimensional Defect Resonators—Measured and Simulated," IEEE MTT-S International Microwave Symposium Digest, Jun. 2000, pp. 1437-1440, vol. 3, Boston, MA.

(Continued)

*Primary Examiner*—Timothy J Dole
*Assistant Examiner*—Farhana Hoque
(74) *Attorney, Agent, or Firm*—Slater & Matsil, L.L.P.

(57) ABSTRACT

A sensor for sensing a measurand is described, the sensor comprising a coplanar waveguide with a first surface and a second surface opposite to the first surface; a first structure with a first periodically varying dielectric characteristic, the first structure being arranged on the first surface of the coplanar waveguide; and a second structure with a second periodically varying dielectric characteristic, the second structure being arranged on the second surface of the coplanar waveguide, wherein a unit-cell of the structures with periodically varying dielectric characteristics is dimensioned such that the sensor has a frequency dependent transfer behavior with at least one transfer minimum, and wherein the sensor is implemented such that the measurand influences the first periodically varying dielectric characteristic of the first structure or the second periodically varying dielectric characteristic of the second structure or a relation between such first structure and second structure.

19 Claims, 27 Drawing Sheets

FOREIGN PATENT DOCUMENTS

| | | |
|---|---|---|
| EP | 1 302 999 A1 | 4/2003 |
| EP | 1 434 299 A1 | 6/2004 |
| EP | 1 760 035 A2 | 3/2007 |
| WO | WO 00/22692 | 4/2000 |

OTHER PUBLICATIONS

Gonzalo, R., et al., "A Low-Cost Fabrication Technique for Symmetrical and Asymmetrical Layer-by-Layer Photonic Crystals at Submillimeter-Wave Frequencies," IEEE Transactions on Microwave Theory and Techniques, Oct. 2002, pp. 2384-2392, vol. 50, No. 10.

Joannopoulos, J.D., et al., "Photonic Crystals: Molding the Flow of Light," 1995, Princeton University Press, Princeton, NJ.

John, S., "Strong Localization of Photons in Certain Disordered Dielectric Superlattices," Physical Review Letters, Jun. 8, 1987, pp. 2486-2489, vol. 58, No. 23, The American Physical Society.

Sor, J., et al., "A Novel Low-Loss Slow-Wave CPW Periodic Structure for Filter Applications," IEEE MTT-S International Microwave Symposium Digest, 2001, 3 pages.

Yablonovitch, E., "Inhibited Spontaneous Emission in Solid-State Physics and Electronics," Physical Review Letters, May 18, 1987, pp. 2059-2062, vol. 58, No. 20, The American Physical Society.

Yablonovitch, E., "Photonic Bandgap Based Designs for Nano-Photonic Integrated Circuits," 2002, pp. 17-20, IEDM, IEEE.

Yablonovitch, E., et al., "Photonic Band Structure: The Face-Centered-Cubic Case Employing Nonspherical Atoms," Physical Review Letters, Oct. 21, 1991, pp. 2295-2298, vol. 67, No. 17, The American Physical Society.

Yang, F., et al., "A Novel Low-Loss Slow-Wave Microstrip Structure," IEEE Microwave and Guided Wave Letters, Nov. 1998, pp. 372-374, vol. 8, No. 11, IEEE.

Yang, F., et al., "A Uniplanar Compact Photonic-Bandgap (UC-PBG) Structure and Its Applications for Microwave Circuits," IEEE Transactions on Microwave Theory and Techniques, Aug. 1999, pp. 1509-1514, vol. 47, No. 8, IEEE.

Menz et al., "Microsystem Technology" (2001) (excerpts only: cover pages & table of contents (12 pages), § 4.6.2, § 6.2.2, § 6.4.6).

* cited by examiner

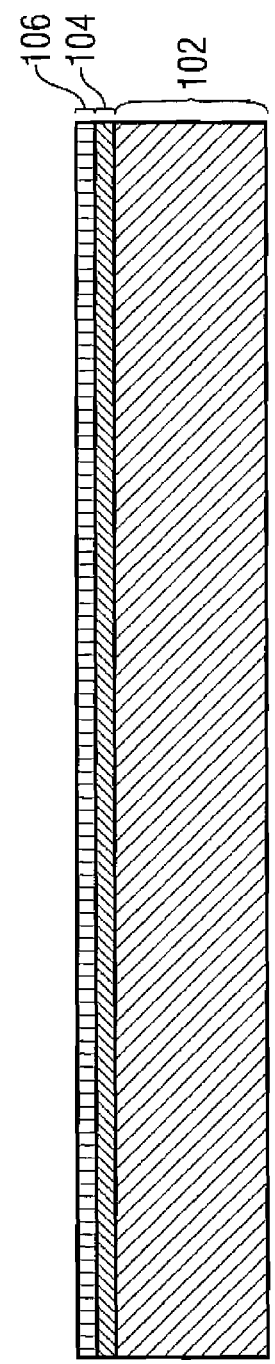
FIG 1A
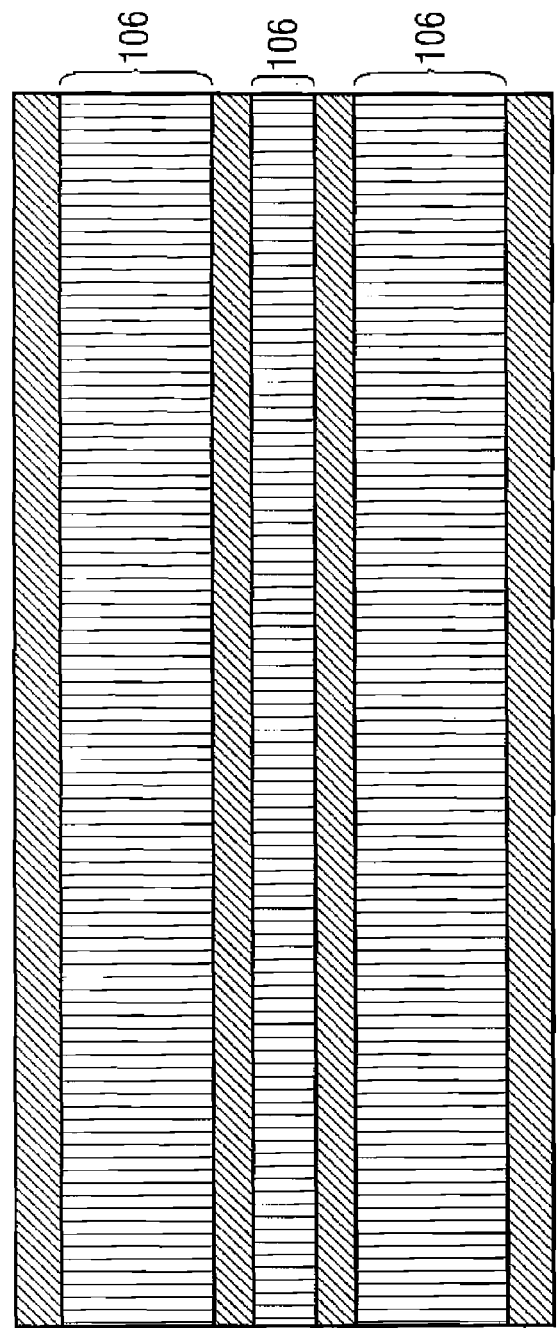
FIG 1B
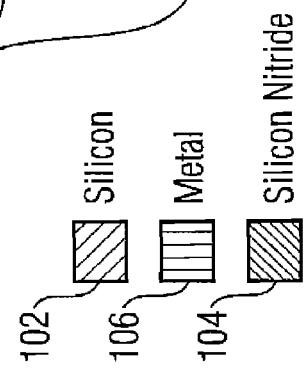

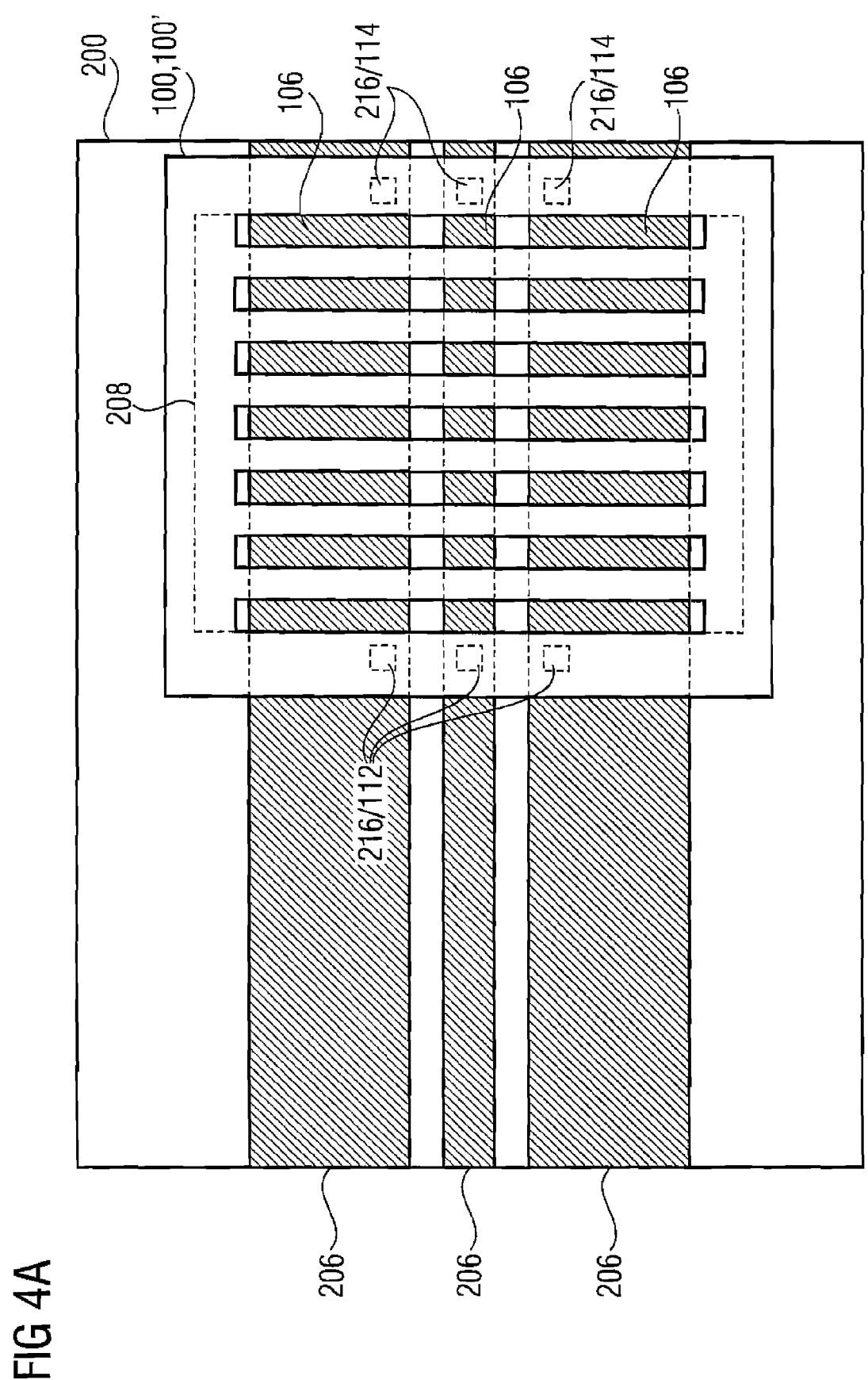

Influencing said first periodically varying dielectric characteristic of said first structure 102' or said second periodically varying dielectric characteristic of said second structure 102 or a relation between said first structure 102' and said second structure 102 by said measurand. — 910

FIG 12

Adapting the first periodically varying dielectric characteristic of the first structure 102' or the second periodically varying dielectric characteristic of the second structure 102, or a relation between the first structure 102' and the second structure 102 such that said filter component, e.g. filter component 100, has a predetermined transfer behavior. —1202

Measuring a transfer behavior of the sensor 100 —1410

Comparing a target state of the actuator 712 with the determined state of the actuator based on the transfer behavior —1420

Controlling the actuator 712 such that the actuator achieves the target state. —1430

1400

SENSOR, METHOD FOR SENSING, MEASURING DEVICE, METHOD FOR MEASURING, FILTER COMPONENT, METHOD FOR ADAPTING A TRANSFER BEHAVIOR OF A FILTER COMPONENT, ACTUATOR SYSTEM AND METHOD FOR CONTROLLING AN ACTUATOR USING A SENSOR

BACKGROUND

Electrical sensors are very common in industry and research, for example, for position measurements, distance measurements, angle measurements, and acceleration measurements, or as gas and fluid sensors. Important factors for the selection of an integrated sensor are: reliable measurement results, accuracy, resolution, lifetime, cost and compatibility with silicon technology and electronic industry.

SUMMARY OF THE INVENTION

According to an embodiment of the present invention, a sensor for sensing a measurand comprises a coplanar waveguide comprising a first surface and a second surface opposite to the first surface; a first structure with a first periodically varying dielectric characteristic, the first structure being arranged on the first surface of the coplanar waveguide; and a second structure with a second periodically varying dielectric characteristic, the second structure being arranged on the second surface of the coplanar waveguide, wherein a unit-cell of the structures with the periodically varying dielectric characteristics is dimensioned such that the sensor has a frequency dependent transfer behavior with at least one transfer minimum, and wherein the sensor is implemented such that the measurand influences the first periodically varying dielectric characteristic of the first structure or the second periodically varying dielectric characteristic of the second structure, or a relation between the first structure and the second structure.

Embodiments of the sensor are based on electromagnetic band-gap structures (EBG), and are compatible with silicon technology and/or can be implemented as micro-electromechanical devices (MEM devices).

According to another embodiment of the present invention, a filter component comprises a coplanar waveguide comprising a first surface and a second surface opposite to the first surface; a first structure with a first periodically varying dielectric characteristic, the first structure being arranged on the first surface of the coplanar waveguide; and a second structure with a second periodically varying dielectric characteristic, the second structure being arranged on the second surface of the coplanar waveguide, wherein a unit-cell of the structures with the periodically varying dielectric characteristics is dimensioned such that the filter component has a frequency dependent transfer behavior with at least one transfer minimum; and a filter control, implemented to adapt the first periodically varying dielectric characteristic of the first structure or the second periodically varying dielectric characteristic of the second structure or a relation between the first structure and the second structure such that the filter component has a predetermined transfer behavior.

Embodiments of the filter component are based on electromagnetic band-gap structures (EBG), that provide a filter component with adaptable transfer behavior, compatible with silicon technology and/or can be provided as micro-electromechanical devices.

BRIEF DESCRIPTION OF THE DRAWINGS

Embodiments of the present invention are described hereinafter making reference to the appended drawings.

FIGS. 1A-1E show steps of a production of a discrete realization of an embodiment of a sensor or filter component as an one-dimensional electromagnetic band-gap structure;

FIG. 4A shows a top-view of an embodiment according to FIG. 2E in normal or linear design;

FIG. 12 shows a flowchart of an embodiment of a method for adjusting a transfer behavior of a filter component;

FIG. 14 shows a flowchart for a method for controlling an actuator system using a sensor.

DETAILED DESCRIPTION OF ILLUSTRATIVE EMBODIMENTS

Figure 1C:
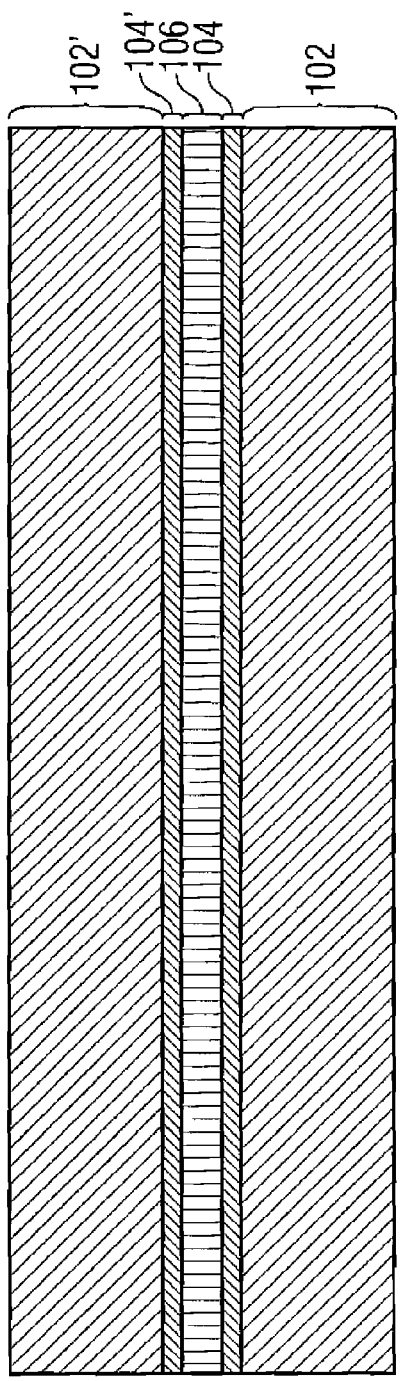

In the following same or similar objects with same or similar functional properties are denoted with the same reference signs.

Before discussing the different embodiments of the sensors and/or filter components a short overview on electromagnetic band-gap technology is provided for a better understanding of the embodiments. Embodiments of a new radio frequency (RF) and/or microwave electromagnetic band-gap structure for usage as sensor and/or adaptable filter components are described which fulfill the aforementioned criteria of reliable measurement results, accuracy, resolution, lifetime, cost and compatibility with silicon technology and electronic industry. The 3-dimensional full-wave electromagnetic simulator of HFSS from ANSOFT Inc. has been used to predict and analyze the sensor and/or filter component performance in detail.

In the following, an embodiment for a method for realization of an embodiment of a device or structure and the basic principle of the structure is described. It should be noted that embodiments of the device or structure can be used as a sensor or filter component, or in other words embodiments of the sensor and the filter component share the same basic structure.

Embodiments of the electromagnetic band-gap structure comprise, for example, a coplanar waveguide with a periodic silicon-air substrate which results in a 1-dimensional (1D) electromagnetic band-gap structure compatible with silicon planar based technologies. Embodiments of the structure, can, for example, be used as a radio frequency/microwave position sensor. Normally electromagnetic band-gap structures need several periods of an artificial primitive cell of the electromagnetic crystal which is equal to half the wavelength signal. This leads to large dimensions of realized embodiments of the devices. Since the coplanar waveguide transmits the electromagnetic wave and can easily be patterned into a meander shape, embodiments with meander-shaped coplanar waveguides can be used to drastically decrease the dimensions of the embodiments of the devices.

FIGS. 1A to 1E depict an embodiment of a fabrication process for a discrete realization of such a 1-dimensional electromagnetic band-gap structure. There are two methods, proper for this fabrication process to etch the vertical and deep structures with high aspect ratio in a silicon substrate. The first standard method is anisotropic etching of silicon with (110) orientation KOH or other solutions, the other is the method of advanced silicon etching (ASE). The advanced silicon etching is faster and can be used for silicon wafers with different orientations, but needs an expensive instrumentation to perform the plasma etching.

In a first step of an embodiment of the fabrication process, a thin layer 104 of silicon nitride or silicon dioxide, about 300 nm thick is deposited on two silicon substrates or silicon wafers 102 with (110) orientation if the KOH silicon wet etching is used. Then a standard metallization is used to form a finite ground coplanar waveguide 106 or waveguide metallization 106. The result is a coplanar waveguide 106 on top of a silicon substrate 102 with a thin layer of silicon nitride 104 in between, as shown in FIG. 1A (cross-sectional view of the result). FIG. 1B shows a top-view of the structure according to FIG. 1A.

A silicon nitride layer is deposited and patterned on both sides of the wafers 102 and vertical deep silicon etching is performed. Another alternative approach is to make coplanar waveguides only on one wafer 102 and cover it with a thin layer of silicon dioxide 104, and one wafer 102' is put on the other 102 to reach the final structure presented in FIG. 1C to FIG. 1E. FIG. 1C shows the result, for example, after a second wafer 102' has been put onto the other, forming a structure of a substrate 102 on the bottom, a silicon nitride layer 104, a coplanar waveguide 106 on top of the lower silicon nitride layer 104, an upper silicon nitride layer 104' on top of the coplanar waveguide 106 and an upper substrate 102' on top of the upper silicon nitride layer 104'.

Figure 1D:
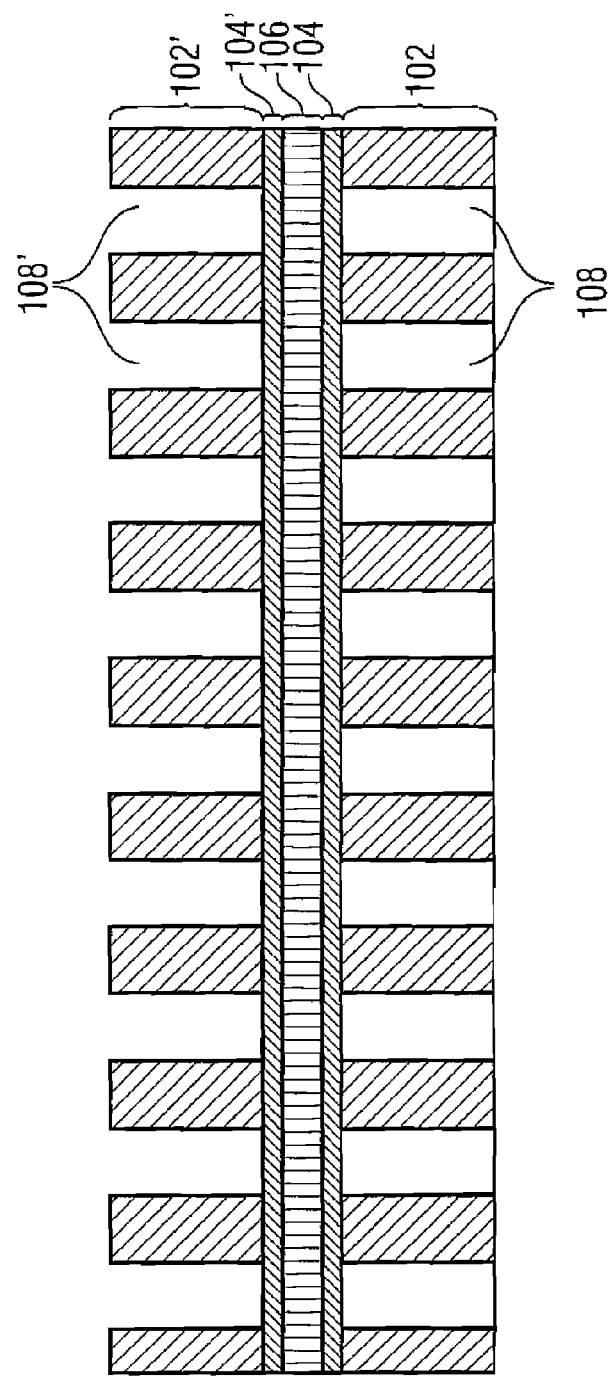

FIG. 1D shows the resulting structure after vertical deep silicon etching was performed to create a periodic structure of substrate 102, 102' and holes 108, i.e., air 108. The periodic structure is the same for the upper substrate 102' and the lower substrate 102. The silicon nitride layer 104, 104' above/under the metallization 106 protects the metal, for example, aluminum, against the etchant, e.g., KOH. Simple indicating structures can be used on both wafers 102, 102' to indicate the end of the etching process. After removing the silicon nitride 104, 104' and scribing the wafers the discrete realization of the device is done, see FIG. 1E. The top-patterned silicon piece 102' can, for example, easily move back and forth on the similar silicon piece 102 underneath.

Alternatively, other embodiments for producing, for example, a movable top patterned silicon piece 102', are possible, leaving, for example, a very thin air gap between the movable top patterned part 102' and fixed parts like the coplanar waveguide and the bottom patterned part 102.

Figure 1E:
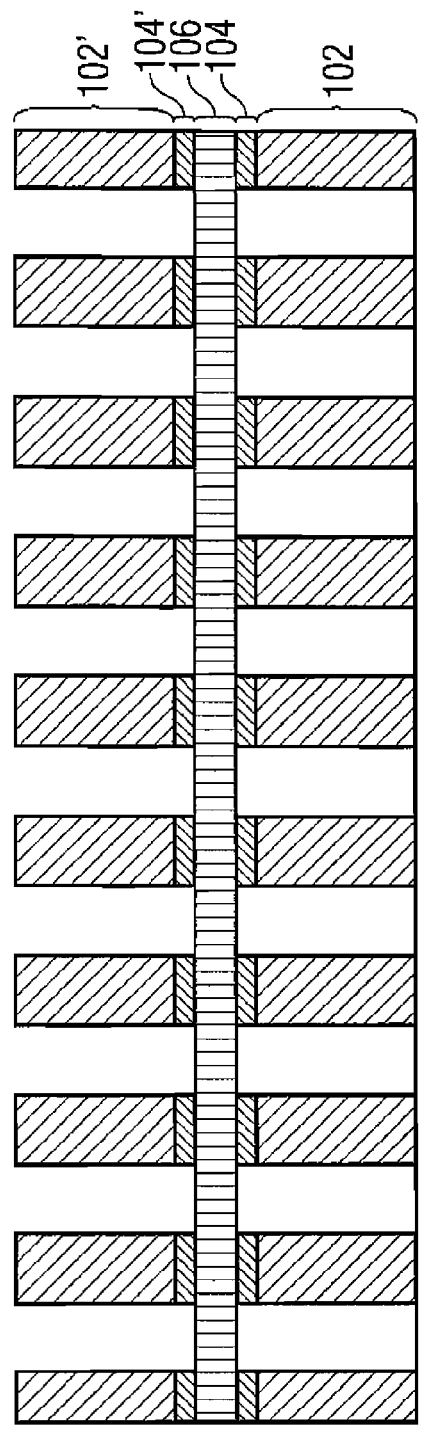

In the following, it is distinguished between two embodiments of the devices. In a first embodiment 100 the top patterned silicon piece 102' or upper structure 102' can easily move back and forth on the bottom patterned silicon piece 102 or lower structure 102. Therefore, the first embodiment 100 can also be referred to as first device structure 100 or as an embodiment with a moveable first structure 102'. In a second embodiment 100' the upper structure 102' is fixed with regard to the lower structure 102 in a position as shown in FIG. 1E. Therefore, the second embodiment 100' can also be referred to as second device structure 100' or as embodiment with a fixed first structure 102'.

Both embodiments 100 and 100' are shown in FIG. 1E. Both embodiments 100, 100' of the structure can be used to implement the sensor or filter component as the basic structure of embodiments of a sensor and a filter component are the same. Thus, features and characteristics of the embodiments explained for a sensor also apply to the embodiments of a filter component and vice versa, unless stated otherwise.

FIGS. 2A to 2E illustrate an embodiment of a flip-chip integration of an embodiment of a sensor/filter component into silicon based technologies. The main structure 200, the embodiment of the sensor/filter component 100 is integrated into, can be made using the aforementioned method and the substrate material for generating the cavity 208 in the main wafer 200 can be removed using standard KOH wet etching or ASE. Since an orientation of the silicon substrate 200 used for standard silicon technologies is (100), in case a vertical structure is preferred, advanced silicon etching (ASE) should be used. The main structure 200 can also be referred to as main substrate 200 or main device 200.

Figure 2A:
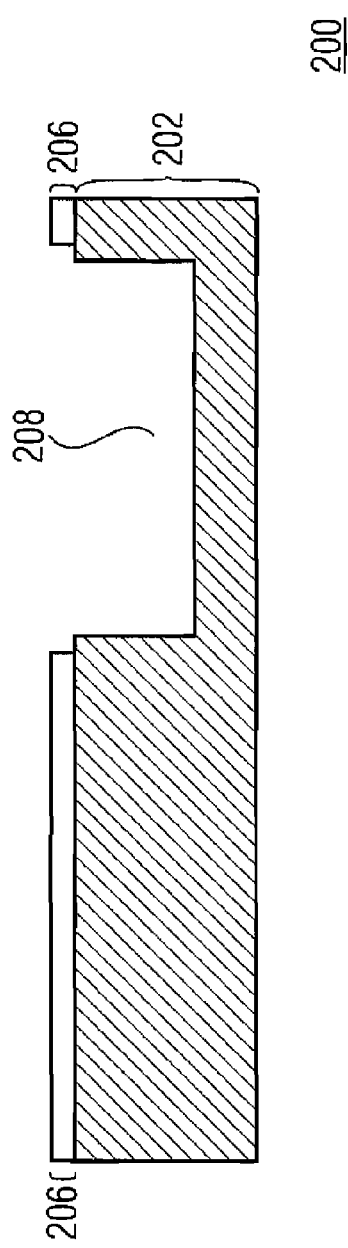
FIGS. 2A-2E shows steps of a flip-chip integration of an embodiment of a sensor or filter component according to FIG. 1E into silicon-based technologies.
Figure 2B:
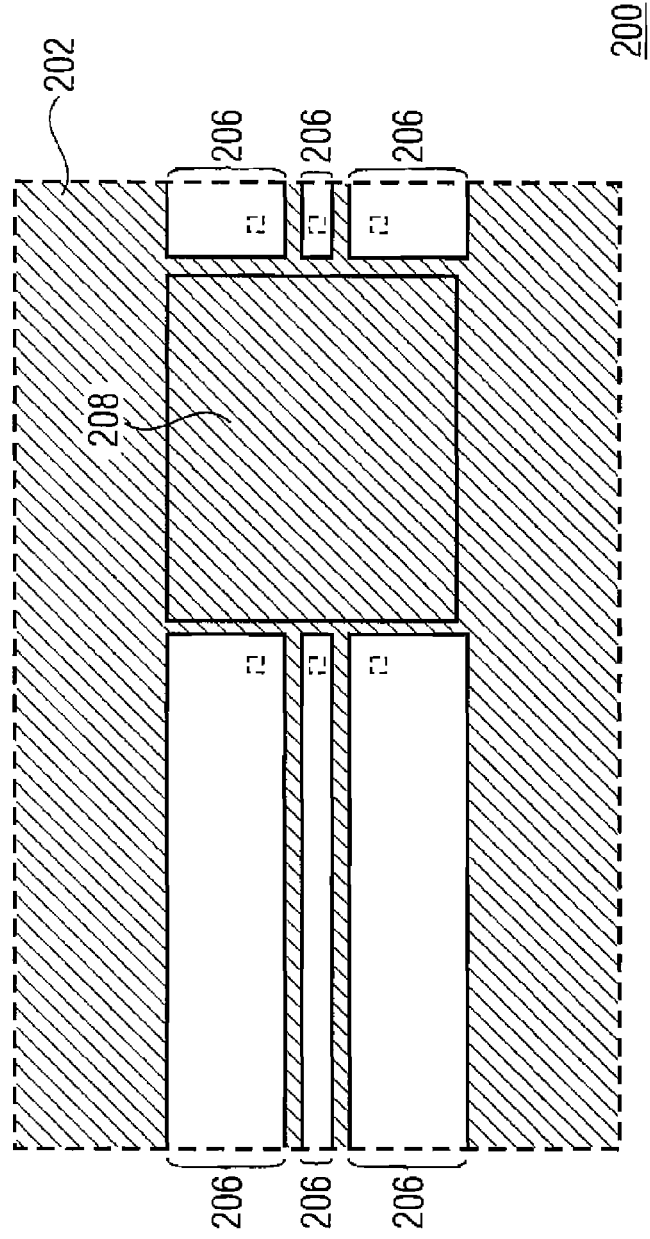

FIG. 2A shows a cross-section of an embodiment of the main device 200 for embedding or integrating the device 100, 100', the main device comprising a main substrate 202, a coplanar waveguide 206 of the main device 200 and the cavity 208. FIG. 2B shows a top-view of the main device 200.

Figures 2C, 2D:
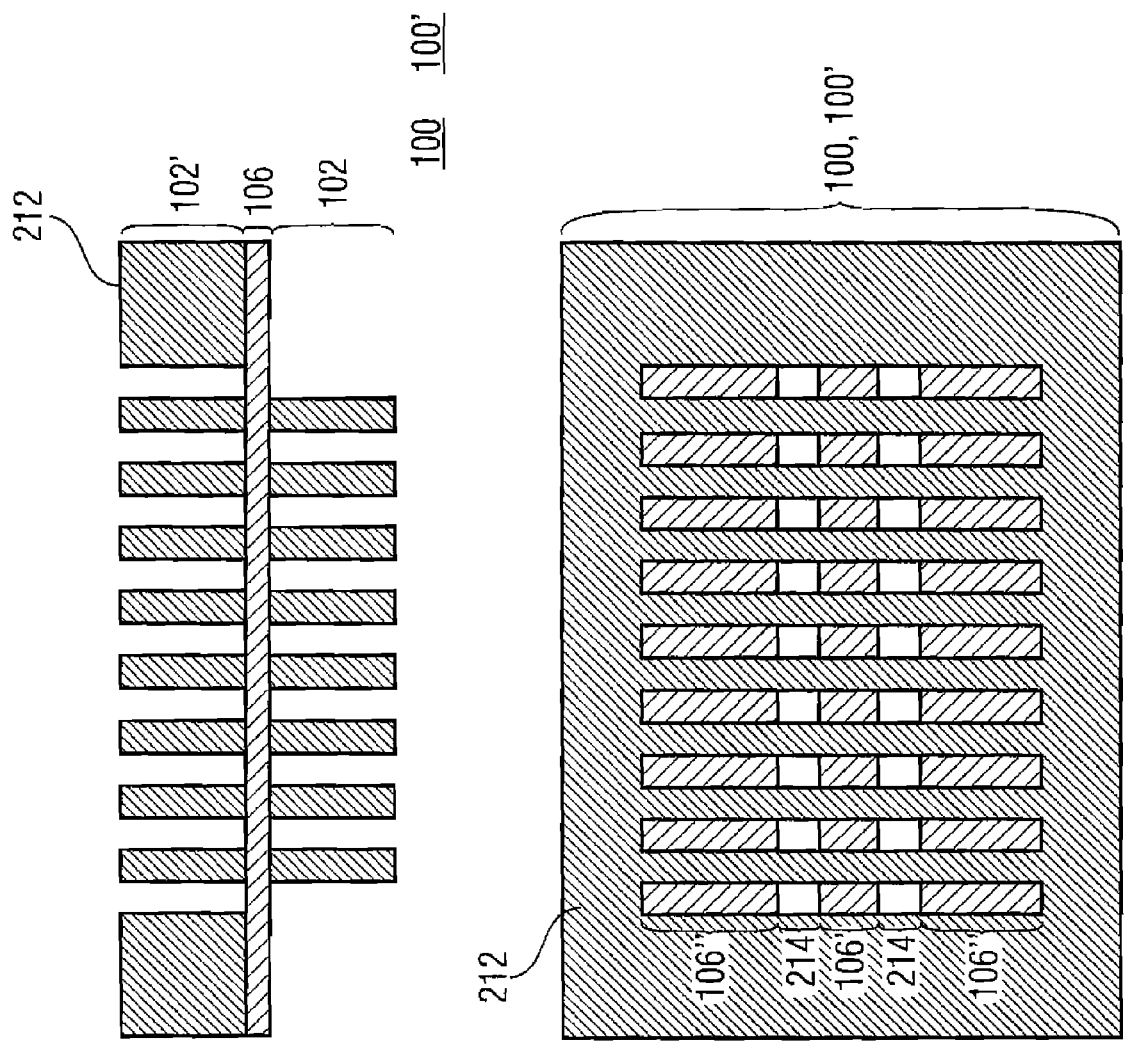

FIG. 2C shows a cross-section of embodiments 100, 100' with a frame 212 surrounding the first structure 102'. Means like a frame 212 can, for example, be used in embodiments 100 with a movable first structure to, the hold the first structure 102'. The upper and lower silicon nitride layers 104, 104' of FIG. 1E are not shown.

FIG. 2D shows a top-view of embodiments of a sensor/filter component 100,100' according to FIG. 2C with the frame 212 holding the periodic structure of substrate material and holes. Reference signs 214 refer to the spaces between the signal metallization 106' in the center of the coplanar waveguide metallization 106 and the two ground metallizations 106" of the coplanar waveguide metallization 106 on both sides of the signal metallization 106'.

Figure 2E:
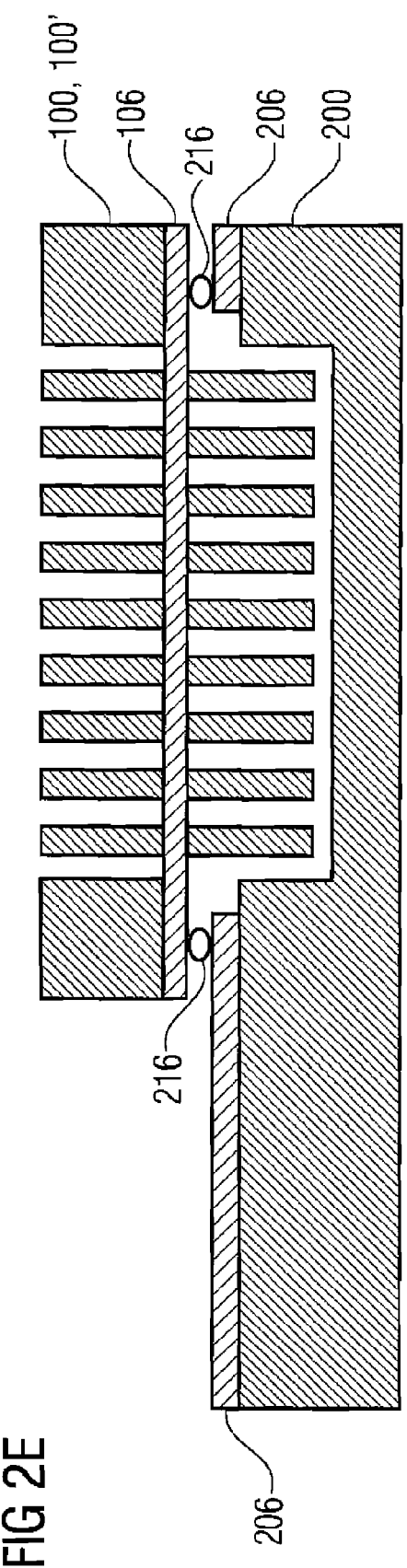
Figure 3:
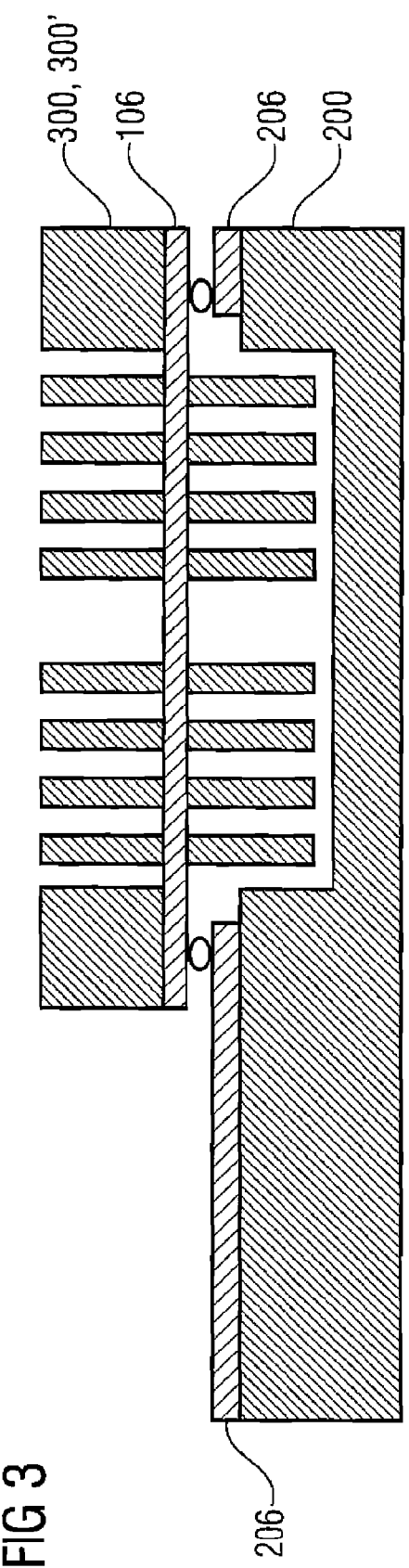
FIG. 3 shows another embodiment of a sensor or filter component as a micro-cavity integrated into silicon based technology as shown in FIG. 2E.

The last step is just the flip-chip mounting of the device 100, 100' on the main wafer 200. The coplanar waveguide 106 of the device 100, 100' is connected to the coplanar waveguide 206 of the main device 200, for example, by solder bumps 216. The resulting structure, i.e., the device 100, 100' integrated into the main device 200 is shown in FIG. 2E, and can be used as sensor, filter or micro-cavity for microwave and millimeter wave applications. The integration of the device 100, 100' can also be referred to as embedding the device 100, 100' into the main substrate 200. FIG. 3 shows an embodiment for a micro-cavity device 300, 300', which corresponds to the embodiments of the devices 100, 100' except for one removed periodic cell of a sensor/filter structure 100, 100'.

To design a device 100, 100', 300, 300', as a sensor, filter or micro-cavity based on the aforementioned technology, a 3-dimensional electromagnetic vector analysis is needed. For a very rough approximation about the dimension of the structure and the resonance frequency of the structure, the following simple calculations can be used. For a 1-dimensional-layer electromagnetic band-gap structure with dielectric constants of 1 for air and 13 for GaAs (which is near to 11.8 for silicon), the length of one period of the structure (period of air and silicon in the aforementioned embodiment) can be calculated as:

$$a \approx 0.6e8/fm \text{ or } a \text{ [mm]} \approx 6/f \text{ [GHz]} \quad (1)$$

Thus, for an 18 GHz resonance frequency, a period of 333 μm is needed. However, as mentioned before, a new structure or device 100, 100', 300, 300' can be fabricated in a meander-shape. Such a device can be realized in a 1 mm square silicon area.

FIG. 4A shows a top view of an embodiment of device 100, 100' with "normal" or straight shape, i.e., with straight coplanar waveguides 106, integrated into the main substrate 200. The coplanar waveguides 106 of the device 100, 100' are connected by a connection 216 to the respective coplanar waveguides 206 of the main substrate 200.

FIG. 4A shows a top view of an embodiment 100, 100' of the device. The connections 216 on the left side with regard to FIG. 4A form the input gate for gate 1 112 of the device 100, 100' and the connections 216 on the right side with regard to FIG. 4A form the output gate or gate 2 of the device 100, 100'.

Figure 4B:
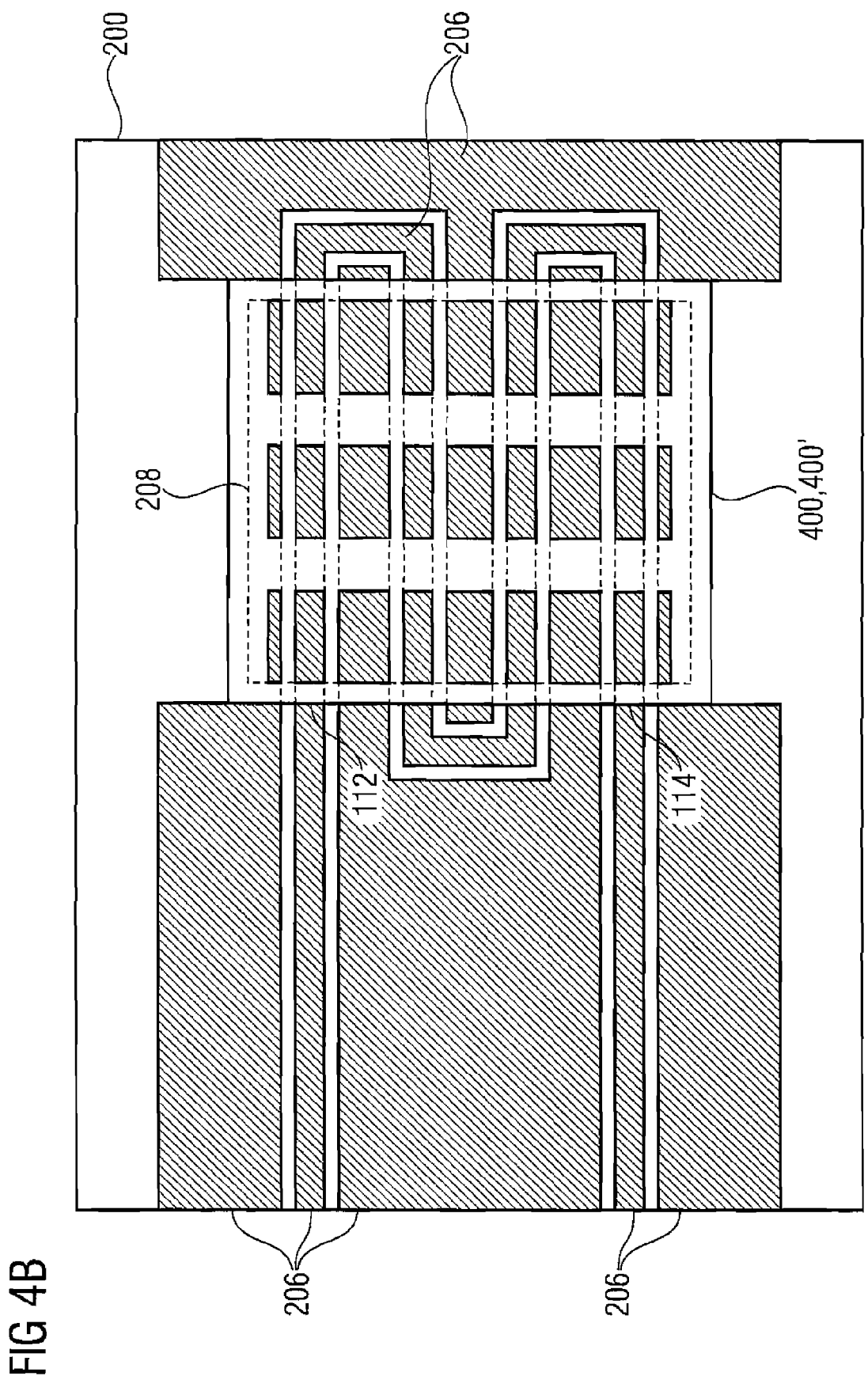
FIG. 4B shows a top-view of an embodiment of a sensor or filter component in meander-shape design.

FIG. 4B shows a top view of an embodiment 400, 400' of the device, a sensor, filter component or micro-cavity, in meander shape, i.e., with coplanar waveguides in meander shape.

As for the aforementioned embodiments 100, 100', 300, 300', reference sign 400 refers to embodiments, where the upper structure 102' can be moved with regard to the lower structure 102, whereas the reference sign 400' refers to embodiments where the upper structure 102' is fixed with regard to the lower structure 102.

In the following, 3-dimensional electromagnetic calculations are used to predict the characteristics of embodiments of the device (sensor/filter component) and to present the proper functioning of the idea. The electromagnetic band-gap structure consists of two etched silicon pieces 102, 102', one on top of another. In embodiments according to FIGS. 2 to 4 using flip-chip technology, the silicon piece 102 at the bottom is fixed by the flip-chip contacts and the silicon piece at the top 100' is moveable and is, for example, connected such that its displacement can be measured.

Figure 5A:
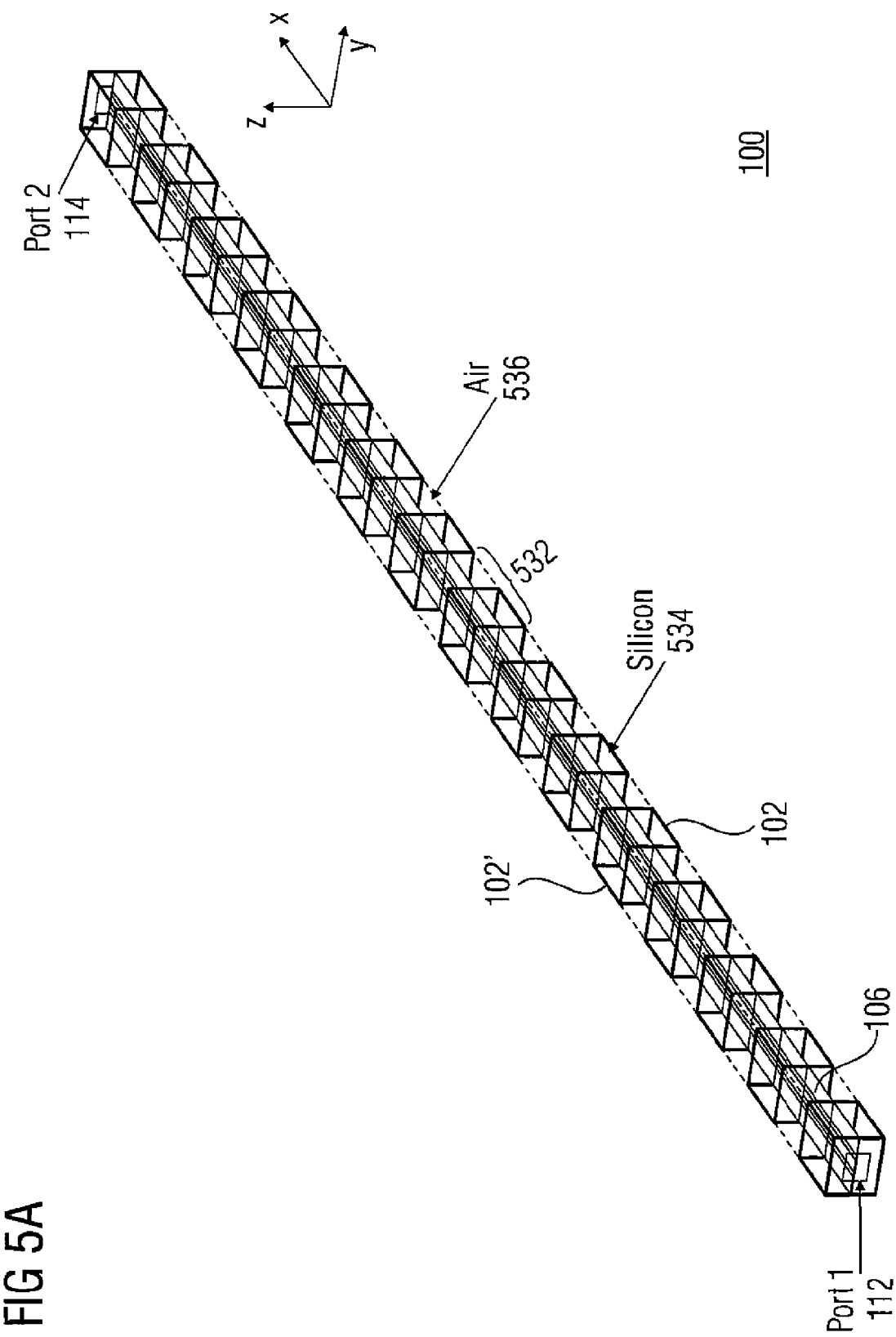
FIG. 5A shows an embodiment of a sensor for position or distance measurement at zero displacement.

FIG. 5A shows an embodiment of an electromagnetic band-gap structure 100 with a moveable upper silicon piece 102' at 0 displacement. The dimensions of the coplanar waveguide 106 are chosen in a way to have a characteristic impedance of 50 Ohms. FIG. 5A shows port 1 112 and port 2 114 and the electromagnetic band-gap structure having a first structure 102' and a second structure 102 with periodic cells 532 or unit-cells 532 comprising a first period of silicon 534 and a second period of air. FIG. 5A further shows the coordinate system (x, y, z).

Figure 5B:
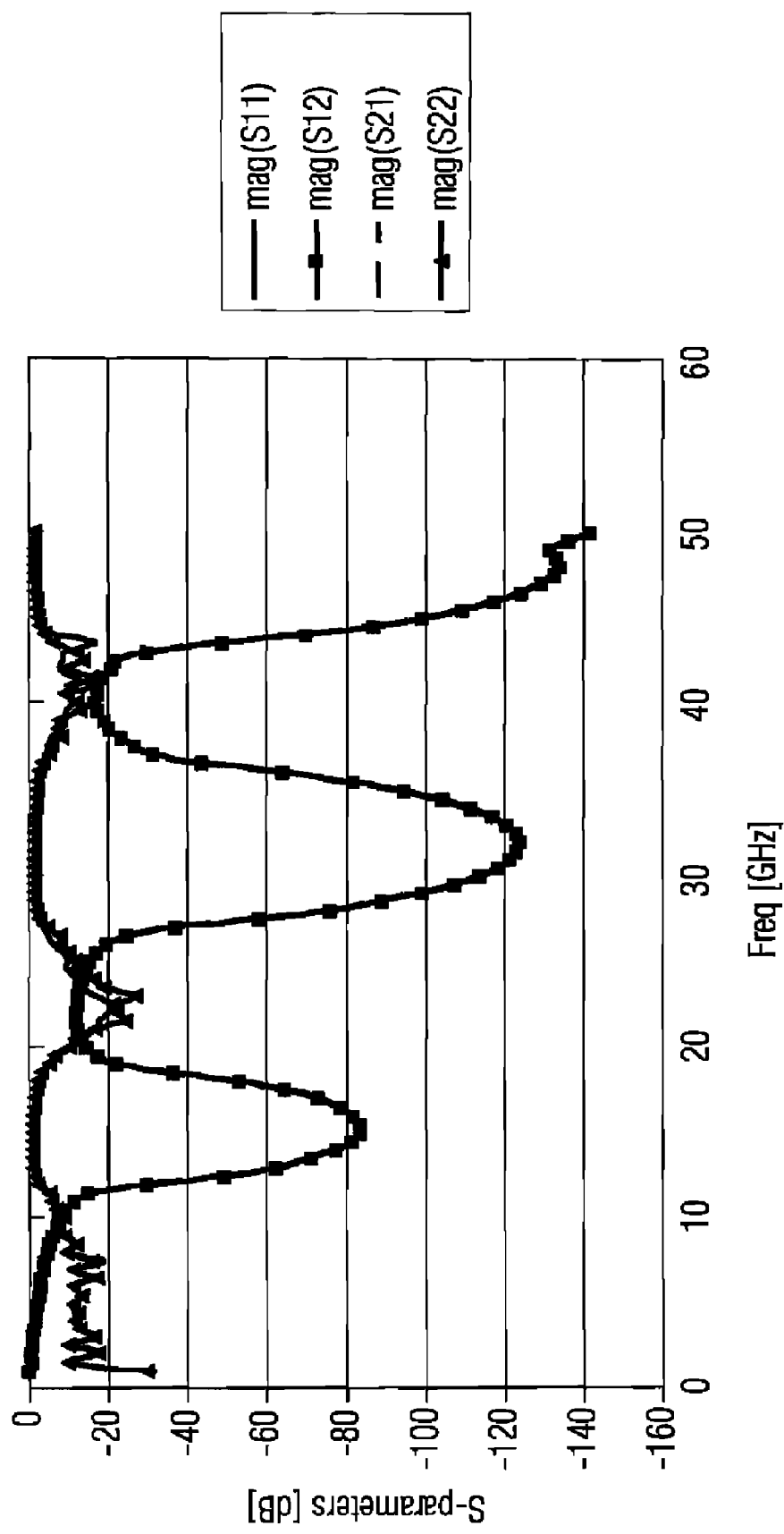
FIG. 5B shows a diagram for S-parameters for the position sensor according to FIG. 5A at zero displacement.

FIG. 5B shows a diagram with calculated scattering parameters (S-parameters) against frequency: S11 being the input port reflection coefficient, S12 the reverse gain, S21 the forward gain and S22 being the output port reflection coefficient. The magnitude of S11 is also referred to as return loss, whereas the magnitude of S21 is also referred to as insertion loss. Since the length of one period 532 of the structure is in this embodiment about 4 mm (a period 532 of the structure comprises in this embodiment a period 536 of air of about 2 mm and a period 534 of silicon of about 2 mm), from equation (1), the first resonance frequency is around 15 GHz, as shown in FIG. 5B.

Figure 5C:
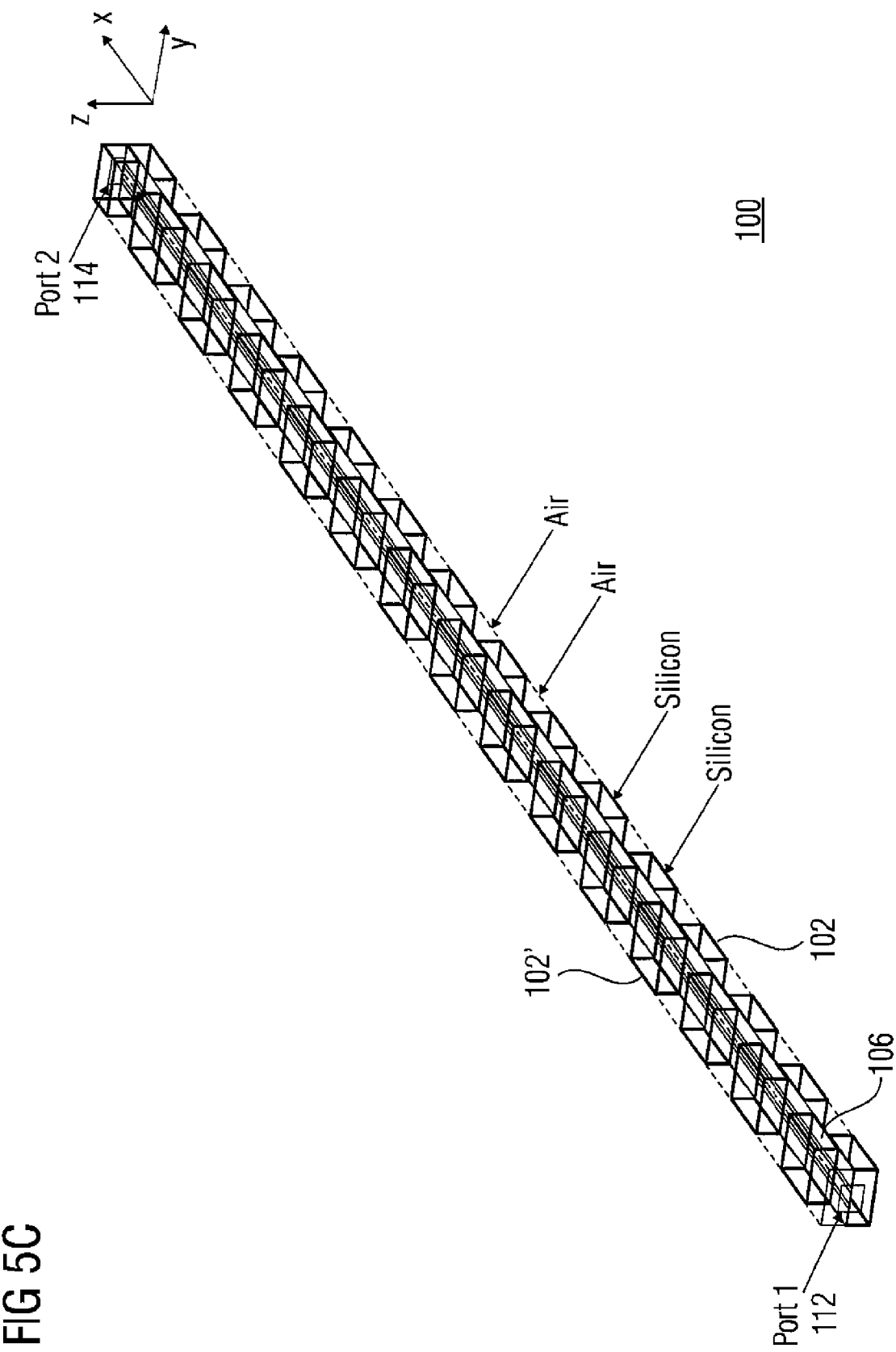
FIG. 5C shows an embodiment of a sensor according to FIG. 5A at 0.8 mm displacement.

FIG. 5C shows the embodiment of a device 100 (sensor/filter component) according to FIG. 5A with about 0.8 mm displacement in the direction of the x-axis.

Figure 5D:
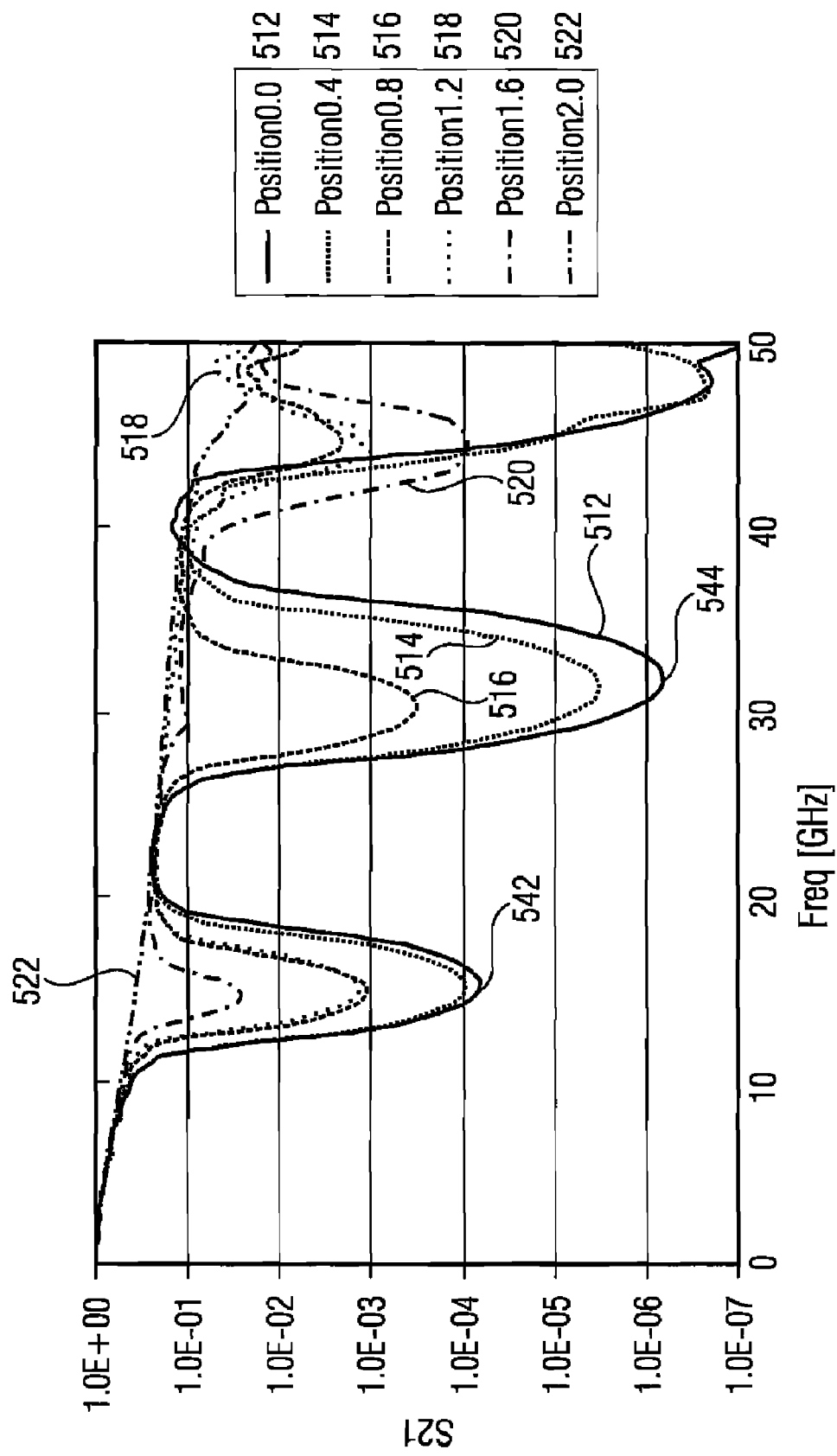
FIG. 5D shows a diagram of a forward gain S21 of an embodiment according to FIGS. 5A and 5C for different displacements.

FIG. 5D depicts the calculated magnitude of S21 of the embodiment of a microwave sensor/filter component for 0 mm 512, 0.4 mm 514, 0.8 mm 516, 1.2 mm 518, 1.6 mm 520 and 2.0 mm 522. As can be seen from FIG. 5F, the embodiment of the position sensor with a non-zero displacement, i.e., the moveable part 102' is moved, has a higher insertion loss and a lower return loss compared to an embodiment or state with zero-displacement. Therefore, one can, for example, apply a microwave reference signal at the input port, port 1, and use the transducer power gain of $G_T = |S21|^2$ as an indicator of the displacement.

The simulated results testify that the measurement range is limited to half of the electromagnetic band-gap unit-cell length, which is about 2 mm for this embodiment. If a reference input signal at the second resonance frequency is used, the measurement ranges will be reduced to one half of the measurement range for the first resonance frequency or one fourth of the electromagnetic band-gap unit-cell length, which is about 1 mm in this example.

Figure 5E:
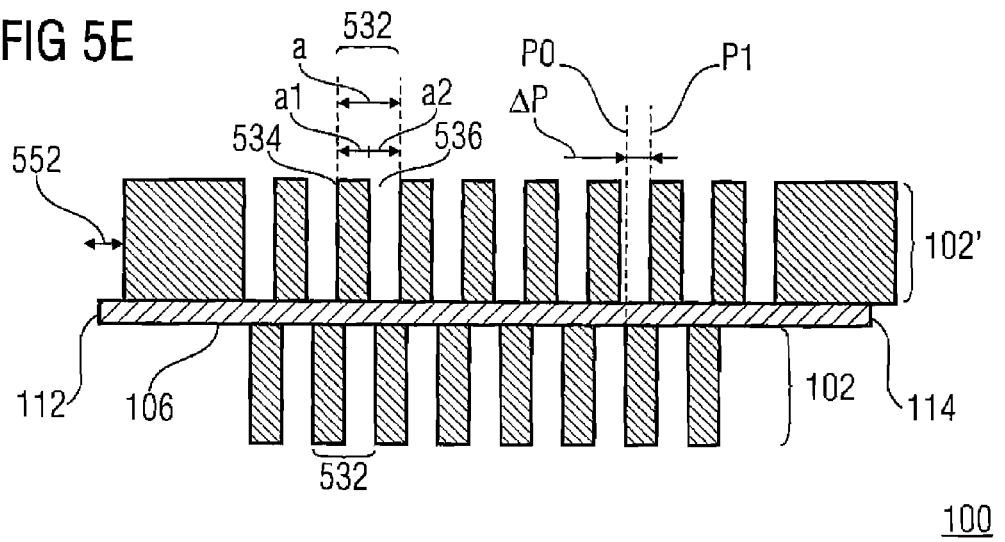
FIG. 5E shows a cross-section of an embodiment of a sensor for measuring an electrical position or distance.

FIG. 5E shows a cross section of another embodiment of a sensor/filter component, for example, according to FIG. 2C. The embodiment of a sensor/filter component 100 comprises a coplanar waveguide 106 with a first surface and a second surface opposite to the first surface, a first or upper structure 102' which is arranged on the first surface of the coplanar waveguide 116 and the second or lower structure 102, which is arranged on the second surface of the coplanar waveguide. The first structure 102' comprises multiple unit-cells 532, each unit-cell comprising a first cell-part 534 and a second cell-part 536. The first cell-part 534 and the second cell-part 536 have different dielectric characteristics. In other words, the first cell part 534 comprises a first material with first dielectric characteristics and the second cell part 536 comprises a second material with second dielectric characteristics, wherein the first and second dielectric characteristics are different to each other and, thus, vary spatially. The first cell-part 534 has a length $a_1$, whereas the second cell-part 536 has a length $a_2$. The sum of the first and second length $a_2$ define the unit-cell-length a of the structure 102, 102', i.e. a=a1+a2.

The first structure 102' and second structure 102 can also be described as a sequence or repetition of such unit-cells 532, and thus, forming a first structure with a first periodically varying dielectric characteristic and a second structure with a second periodically varying dielectric characteristic. The periodically varying dielectric characteristic of the first structure 102' and of the second structure 102 depend on the first and second dielectric characteristic of the first and second cell-part 534 and 536 and their specific length, i.e. the first cell-part length $a_1$ and second cell-part length $a_2$.

Due to the periodic structure, the unit-cell 532 is also referred to as the "period" 532 of the structure, and the unit-cell length a is also referred to as the length a of the period 532. The first length $a_1$ (cell-part length $a_1$) is also referred to as sub-period $a_1$ and the second length $a_2$ (second cell-part length $a_2$) also referred to as sub-period $a_2$.

In the embodiments according to FIGS. 5A and 5C, the first cell-part 534 comprise silicon and the second cell-part 536 comprises air, and both lengths, a1 and a2, are equal.

Although the embodiments explained based on FIGS. 5A to 5E comprise a unit-cell with a first unit-cell-part 534 comprising silicon, and the second cell-part 536 comprising air, i.e., being holes in the silicon-substrate, the first cell-part 534 may be any other substrate material, and may be even treated in a specific way during the production, to produce a first cell-part 534 with a specific first dielectric characteristic, and the second cell-part 536 may be any other material, gas, liquid or solid material with a specific second dielectric characteristic.

Although embodiments explained based on FIGS. 5A to 5D show a first structure 102', where the first cell-part length $a_1$ is equal to the second cell-part length $a_2$, in other embodiments, the first cell-part length may be larger or smaller than the second cell-part length, to obtain a specific first or second periodically varying dielectric characteristic.

In other words, the unit-cell 532 defines a period of the first and second structure 102', 102 and their periodically varying characteristics.

In embodiments of a sensor/filter component 100 with a moveable first structure 102', the second structure 102 has the same periodically varying dielectric characteristic as the first structure 102'. In other words, the second structure 102 comprises the same embodiment of a unit cell. In further embodiments the second structure 102 also comprises the same number of unit cells as the first structure 102'.

The frequency dependent transfer behavior of the devices or structures 100, 100', 300, 300', 400 and 400' depend on the unit-cells of the first structure 102', of the second structure and on the spatial relation between both structures, or in other words the displacement with regard to each other.

Embodiments of structures such as 100', 300', and 400' can be used as sensors for sensing a measurand, where the measurand influences the first periodically varying dielectric characteristic or the second periodically dielectric characteristic, e.g., changing the material respectively dielectric characteristic of the second cell-part, e.g., by filling the holes 108, 536 of the first structure 102' or second structure 102 with a gas, fluid or solid second dielectric material, and obtaining a value of the measurand based on the changed transfer behavior. In other embodiments such structures 100, 300, and 400 can be used as sensors for sensing a measurand, where the measurand influences the relation between the first structure 102' and the second structure 102, e.g., by moving or rotating the first structure 102' with regard to the second structure 102, and obtaining a value of the measurand based on the changed transfer behavior.

In other embodiments, such structures 100, 100', 300, 300', 400 and 400' may be used as an adaptable filter component in a similar manner, where the first periodically varying dielectric characteristic of the second periodically dielectric characteristic are influenced/adapted such that the resulting transfer behavior equals a predetermined transfer behavior or where a relation between the first structure 102' and the second structure 102 is influenced/adapted such that the resulting transfer behavior equals a predetermined transfer behavior.

In embodiments of structures 100, 100', 300, 300', 400 and 400', a unit-cell, or in other words the dielectric characteristics of the first-cell part 534 and the second cell-part 536 and the respective first and second cell-part lengths $a_1$ and $a_2$, and the number of unit-cells is dimensioned such that the structure 100 has a frequency dependent transfer behavior with at least one transfer minimum, e.g., as shown in FIG. 5D. FIG. 5D shows a diagram for the S21 values at zero displacement 512 with a first transfer minimum 542 at the first resonance frequency and a second transfer minimum 544 at the second resonance frequency.

As shown in FIG. 5E, in sensor embodiments 100 for sensing a measurand, the measurand influences the relation between the first structure 102' and the second structure 102, e.g., moves, see arrows 552, the first structure 102' with regard to the second structure 102 influencing the spatial relation between the first and second structure. In other words, the measurand moves the first structure 102' from a reference position P0 to a measurement position P1, the displacement ΔP being defined as ΔP=P1−P0. In embodiments as shown in FIG. 5E the reference position is the zero-displacement position and the measurement positions are the non-zero-displacement positions, but in other embodiments the reference position P0 may be any other non-zero displacement position.

The displacement of the first structure 102' or in general, the change in the spatial relation between the first structure 102' and the second structure 102, results in a change in the transfer behavior of the structure 100, which can be used to obtain a value for the measurand causing the change in relation.

Embodiments of a measuring device based on, e.g., a sensor 100 are later described, based on FIGS. 6 to 8B.

Figure 5F:
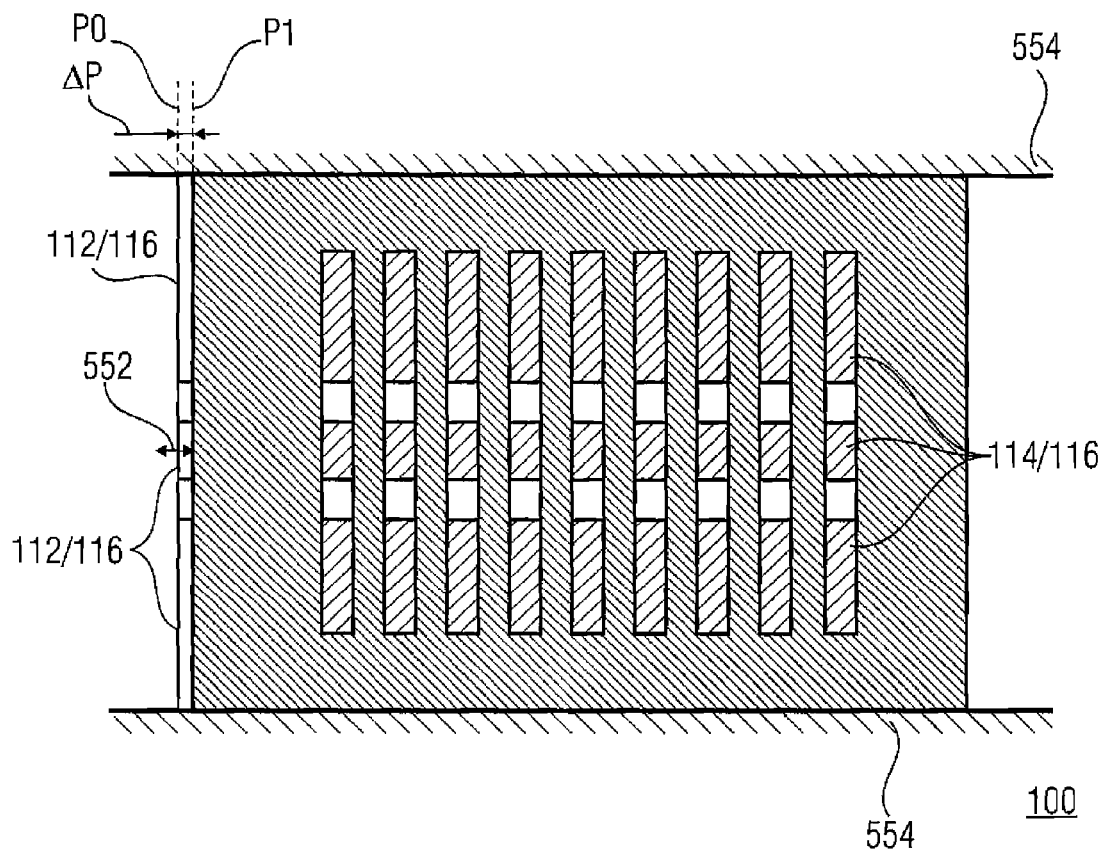
FIG. 5F shows a top-view of an embodiment according to FIG. 5E.

FIG. 5F shows a top view of an embodiment of a structure 100 according to FIG. 5E, where the moveable first structure 102' is movable in one direction, see arrows 552, and is lead by sidewalls 554. The first structure 102' may also be lead by a structure on top of the first structure.

As these embodiments of sensors are based on sensing a displacement between the first and second structure, they are also referred to as position sensors or displacement sensors.

Embodiments of the position sensor are very small with reference signals at higher frequencies, but embodiments of the sensors can be even smaller by using a meander-shape coplanar waveguide. However, in any bend in the coplanar waveguide in meander-shape an odd-mode excitation of the transmission line results and degrades the proper functioning of the sensor. To prevent such undesired modes, air-bridges are used at the bends.

Figure 5G:
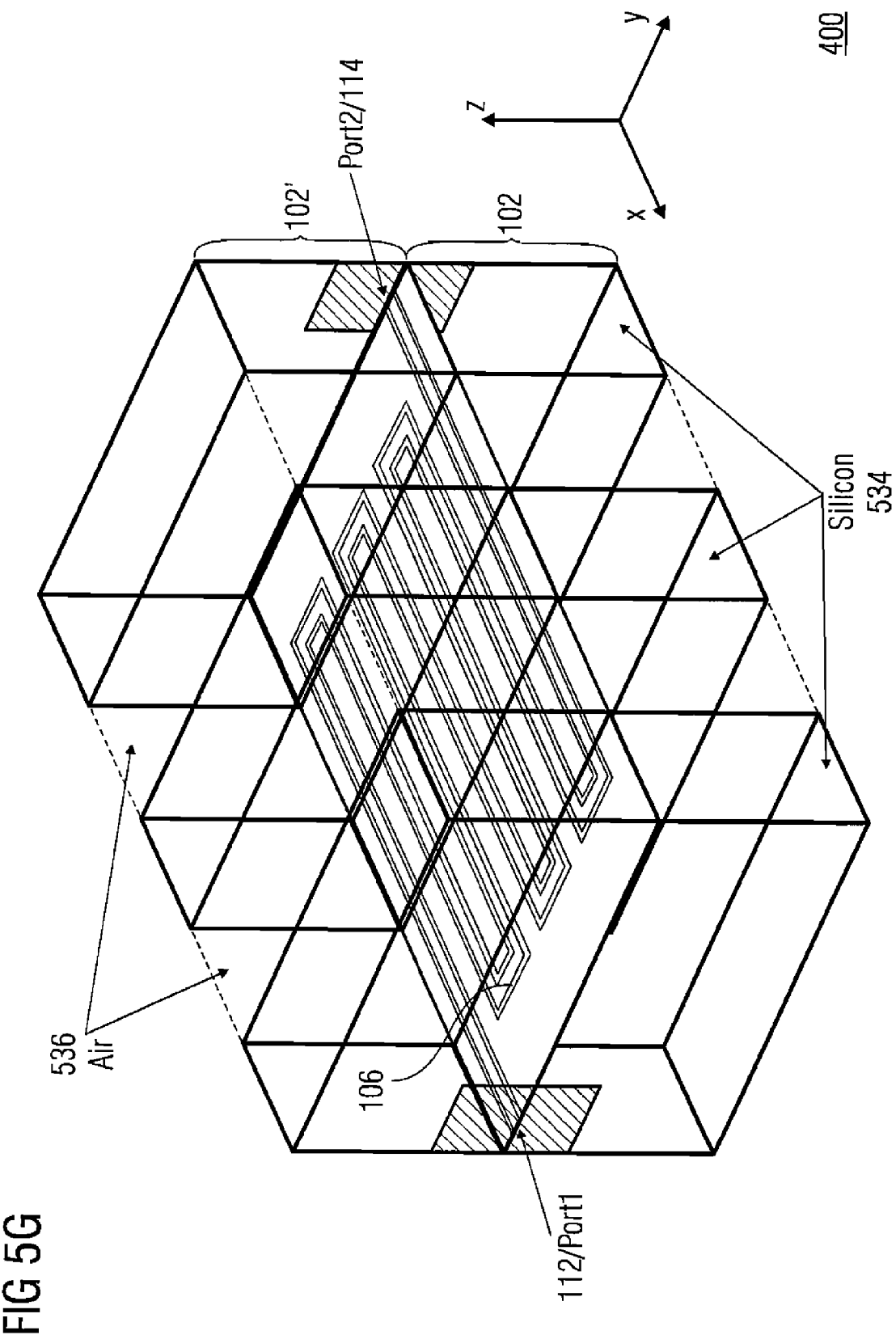
FIG. 5G shows an embodiment of a sensor with meander design of the coplanar waveguide at zero displacement.
Figure 5H:
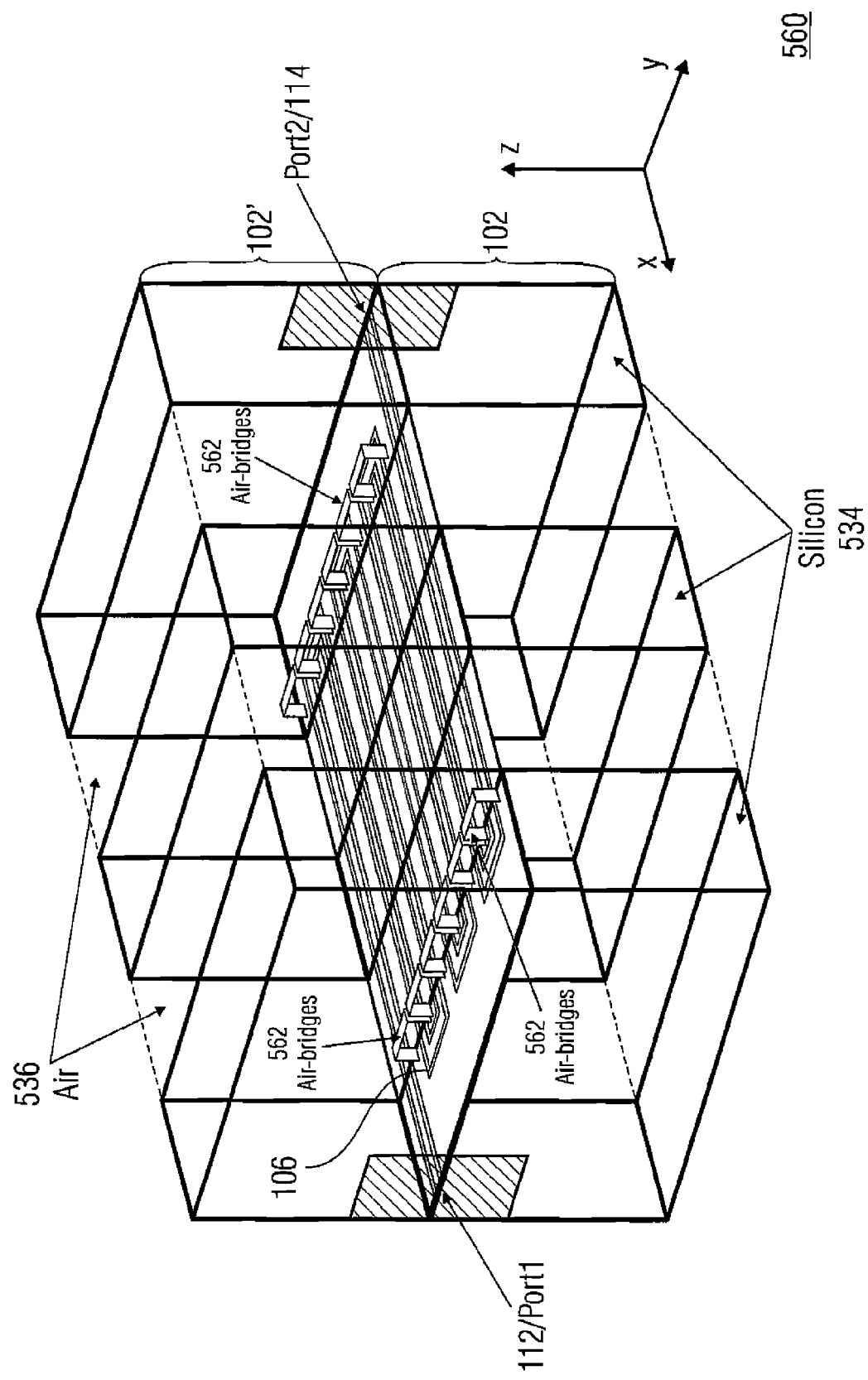
FIG. 5H shows an embodiment of a sensor according to FIG. 5G with air-bridges at the bends of the meander-structure of the coplanar waveguide.

FIG. 5G shows a 3-dimensional view of an embodiment 400 of a structure with meander-shape coplanar waveguides 106 without air-bridges. FIG. 5H shows an embodiment of a structure 560 with meander-shape coplanar waveguides 106 with air-bridges 562 at the bends of the coplanar waveguide 106.

Figure 5I:
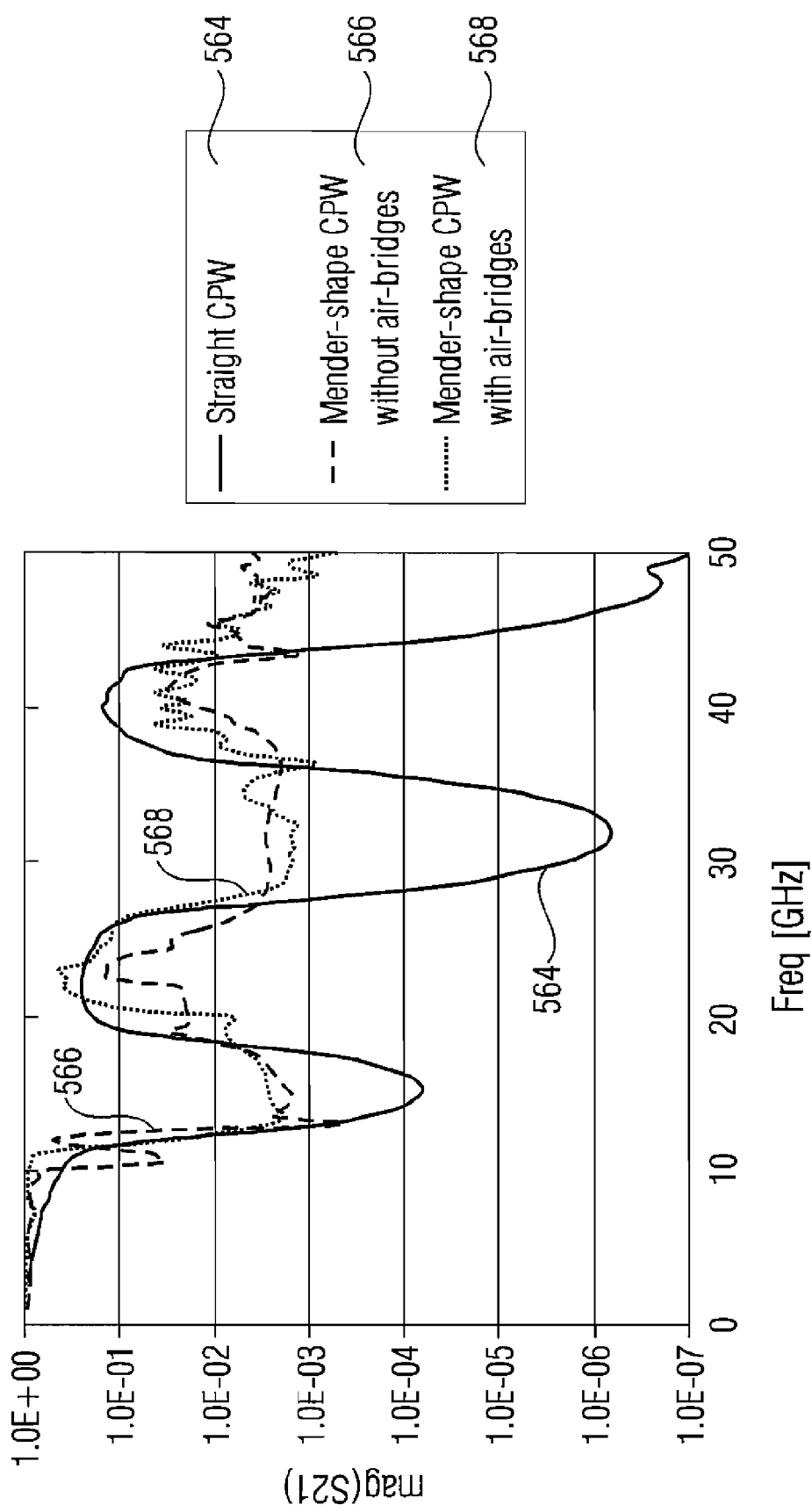
FIG. 5I shows a diagram of a forward gain S21 at zero displacement for an embodiment of a sensor with a straight or linear coplanar waveguide, for an embodiment with a meander-shape coplanar waveguide without air-bridges and for an embodiment of a sensor with meander-shape coplanar waveguides and air-bridges at the bends of the coplanar waveguides.

FIG. 5I shows a diagram of the insertion losses mag(S21) of an embodiment of a structure with the first cell-part 534 comprising silicon and the second cell-part 536 comprising air in the holes, for straight coplanar waveguides 564, for meander-shape coplanar waveguides without air-bridges at the bends 566 and meander-shape coplanar waveguides with air-bridges at the bends 568. The results testify the usefulness of the air-bridges 562.

Figure 6:
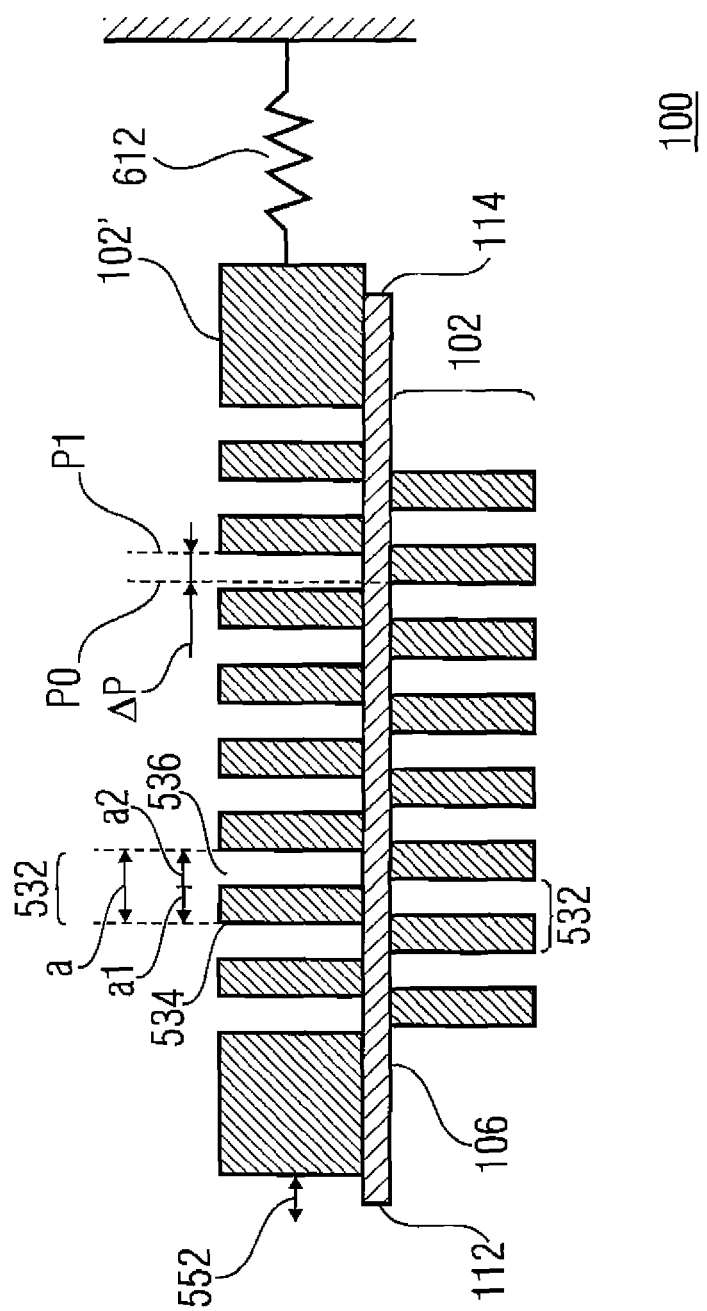
FIG. 6 shows a cross-section of an embodiment of a sensor for lateral shift measurements with a means for restoring.

FIG. 6 shows a cross-section of an embodiment of a structure 100 according to FIG. 5E, which is coupled to a means for restoring 612, depicted symbolically by a spring 612. The means for restoring 612 is implemented to restore the first structure 102' at the reference position P0 after is has been shifted. The means 612 for restoring may be a spring or any other means for restoring, capable of restoring the first structure 102' at the reference position P0.

Applications for structures 100 according to FIG. 6 coupled with a means for restoring 612 are, for example, acceleration sensors, where the first structure 102' is shifted respectively displaced with regard to the second structure 102, depending on the positive/negative acceleration effected on the structure 100.

The first structure 102' may be movable in only one direction, left or right with regard to FIG. 5E, or in both directions, left and right, with regard to FIG. 5E (see arrows 552).

Figure 7:
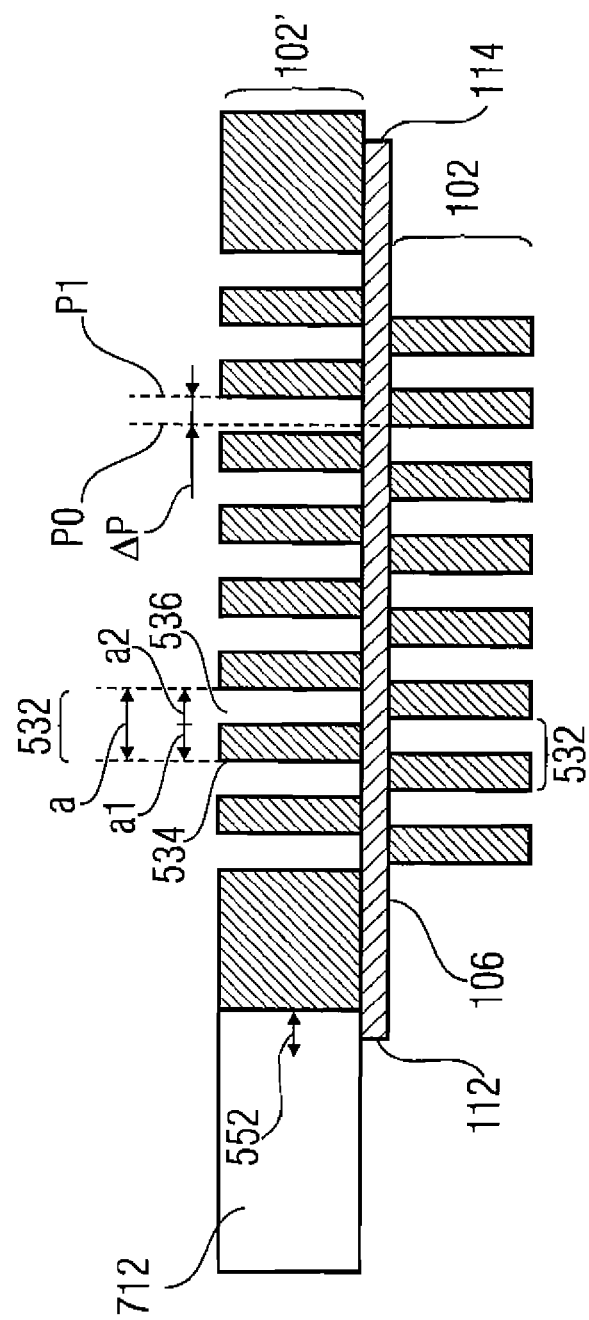
FIG. 7 shows a cross-section of an embodiment of a sensor with an actuator.

FIG. 7 shows a cross-section of an embodiment 100 with a moveable first structure 102', where an actuator 712 is implemented to cause the shift 552 of the first structure 102' with regard to the second structure 102. The actuator 712 may be mechanically coupled to the first structure 102' such that it can move the first structure 102' in both directions, left and/or right with regard to FIG. 7 (see arrows 552).

In further embodiments, the actuator 712 is not fixed to the first structure 102', and thus only can move the first structure 102' in one direction, for example, to the right with regard to FIG. 7. In these applications, additionally a means for restoring 612 may be implemented on the side opposite to the actuator 712, for example, on the right side of the first structure 102' with regard to FIG. 7, to restore the first structure 102' after the measurement at the reference position.

Figure 8A:
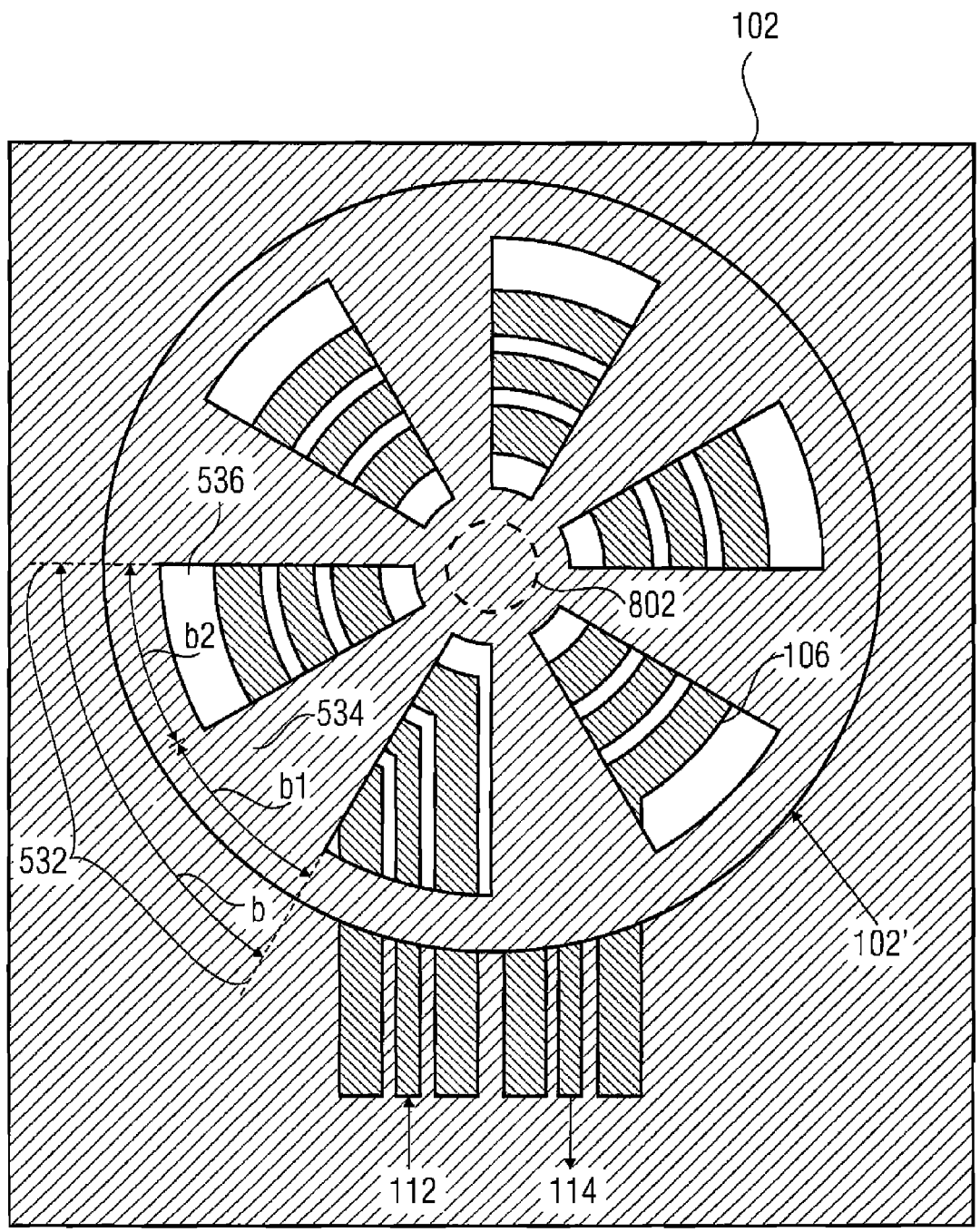
FIG. 8A shows a top-view of a sensor for measuring angles with a first or upper circular structure with a first periodically varying dielectric characteristic on top of a second circular structure with a second periodically varying dielectric characteristic and a circular coplanar waveguide between the first and the second structure.

FIG. 8A shows a top-view of another embodiment of a structure 800 with a circular coplanar waveguide 106, a lower or second structure 102 and a first or upper structure 102'.

Figure 8B:
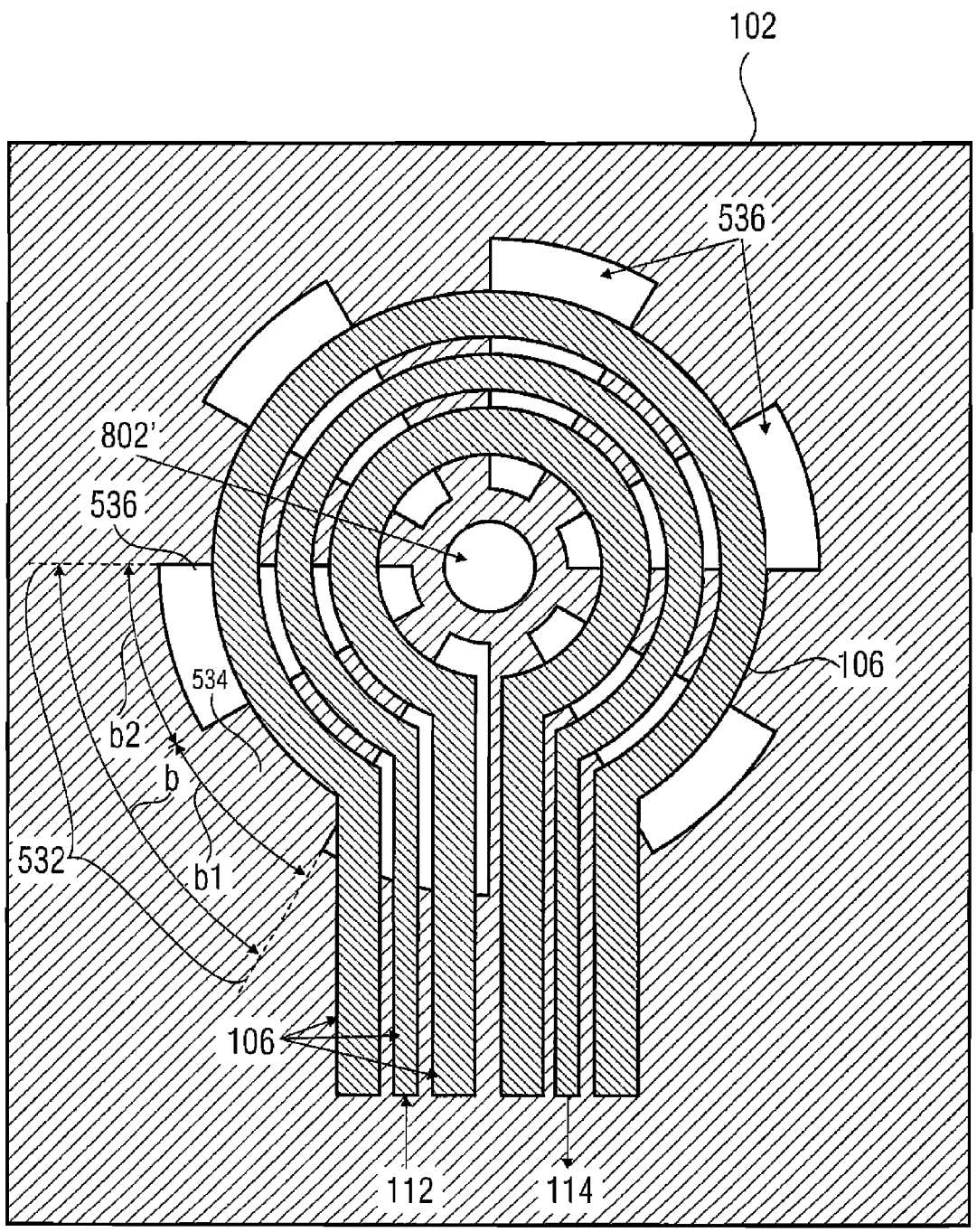
FIG. 8B shows the second or lower structure according to FIG. 8A with the second periodically varying dielectric characteristic and a coplanar waveguide with a circular structure arranged on top.

FIG. 8B shows a top-view of the circular coplanar waveguide 106 on top of the second structure 102 without the first structure 102' on top of both.

As can be seen from FIGS. 8A and 8B, embodiments 800 comprise, similar to the embodiments 100 to 400', a radial unit-cell 532 with a first radial cell-part 534 with a first dielectric characteristic and a first radian b1, and a second radial part 536 with a second dielectric characteristic and a second radian b2. The sum of both radians b1, b2 defining the length of the radian b of the unit-cell or period 532, i.e. b=b1+b2.

For arranging the first structure 102' on the second structure 102, the first structure 102' can, for example, comprise a propone part 802 on the lower part in the center, and the second part a hole 802' in the center. The propone part 80''' extending into the hole 802', thus, mounting the first structure in a rotatable manner on the second structure 102.

The first cell-parts 534 can, for example, be substrate material like silicon and the second cell-parts 536, for example, be etched substrate parts, i.e., holes 536.

In an embodiment 800 with a rotatable first structure 102', the spatial relation between the first structure 102' and the second structure 102 can be changed by rotating the first structure 102' with regard to the second structure 102. Thus, also the transfer behavior is changed with regard to a zero-degree or zero radian displacement.

In an embodiment where the structure is used as a sensor 800, the first structure 102', for example, is rotated depending on a measurand, and thus, the change in the transfer behavior can be used to determine a value for the measurand.

In an embodiment where the structure is used as a filter component 800, the first structure 102' is rotated, for example, by an actuator to achieve a predetermined transfer behavior.

In an alternative embodiment 800', where the first structure 102' is fixed with regard to the second structure 102, the second cell-part 536 can be implemented as holes, which can be filled with gas, fluids or solid materials. The insertion of the gas, fluids or solid material changes the dielectric characteristics of the second cell-part 536, and thus the transfer behavior.

Structures 800' can be used as sensors, where the change in the transfer behavior is caused by the measurand, the gas, the fluid or the solid material, and the change of the transfer behavior is used to determine which material has been inserted, or, as an adaptable filter component, where a different material is inserted into the second cell-part 536 to achieve a predetermined transfer behavior.

Similar to the embodiments 100, 100', 300, 300' with linear or normal coplanar waveguides, or the embodiments 400, 400' with meander-shaped coplanar waveguides, the resonance frequency is determined by the unit-cells, the dielectric characteristic of the first and second cell-part 534, 536 and the first radian b1 and the second radian b2 of the first cell-part 534 and the second cell-part 536.

Figures 9A, 9B:
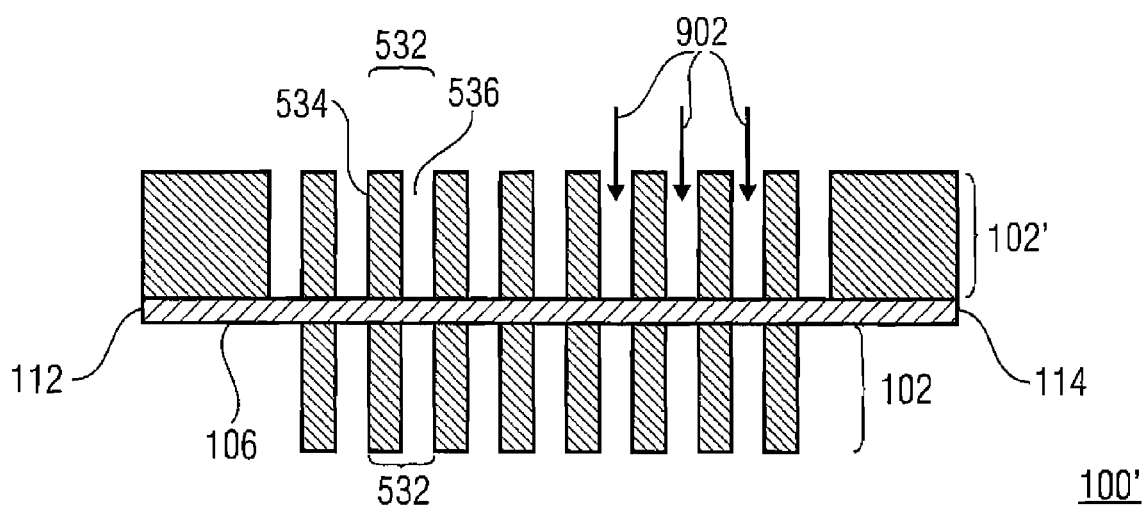
FIG. 9A shows a cross-section of an embodiment of a sensor for measuring or detecting a gas or fluid.
FIG. 9B shows a flowchart of an embodiment of a method for sensing a measurand using a sensor.

FIG. 9A shows a cross-section of an embodiment 100' where the first structure 102' is fixed with regard to the second structure 102. In these embodiments, the first cell-part 534 comprises a solid material, for example, the substrate material, and the second cell-part 536 is a hole in the substrate material. For achieving a reference dielectric characteristic and reference transfer behavior similar to the reference position, the holes 536 can be filled with air, or any other reference gas or liquid. For sensing or adapting the filter component, these reference materials 536 are replaced or mixed (see arrow 902) with other gas, fluids or even solid materials, with a different dielectric characteristic compared to the reference material in the second cell-part 536. Thus, the transfer behavior of the structure 100' is changed. The change of the transfer behavior can be used for sensing a measurand, i.e., the gas, fluid or solid material inserted into the second cell-part 536 due to the change of the second dielectric characteristic, or can be used for achieving a predetermined filter characteristic by inserting a gas, fluid or solid material with a specific second dielectric characteristic.

FIG. 9B shows a flowchart of an embodiment of a method 900 for sensing a measurand using, for example, a sensor 100, 100'. The method comprises the step 910 of the measurand influencing the first periodically varying dielectric characteristic of the first structure 120' or the second periodically varying dielectric characteristic of the second structure 102 or a relation between the first structure 102' and the second structure 102.

Figure 10A:
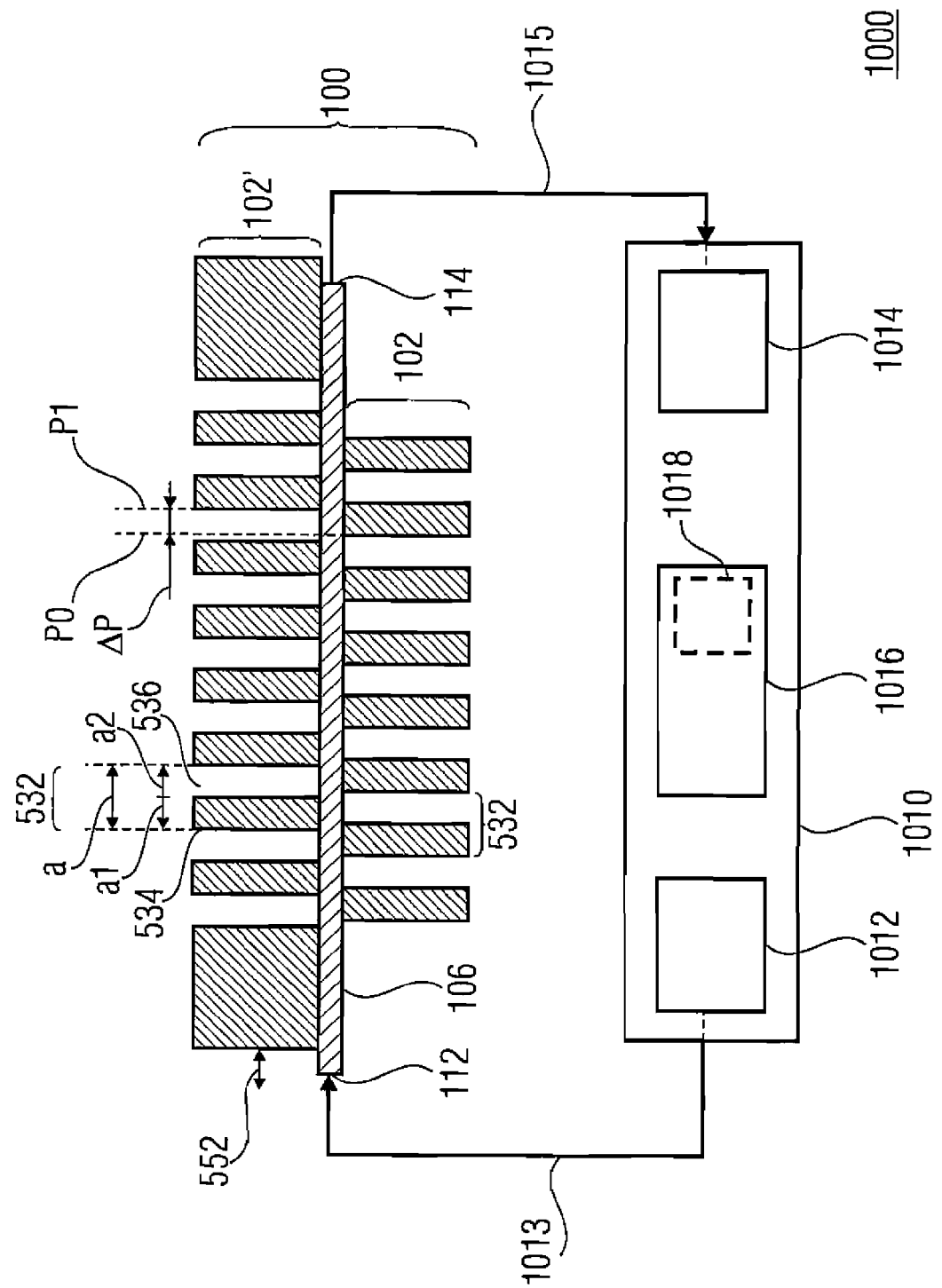
FIG. 10A shows a block diagram of a measuring device with a sensor and a measuring means.

FIG. 10A shows a schematic view of a measuring device 1000 with a sensor for sensing 100 and a measuring means 1010. The measuring means 1010 is implemented to measure a transfer behavior of the sensor 100 to determine the measurand influencing the transfer behavior of the sensor 100.

In alternative embodiments, the measuring device 1000 may comprise other embodiments of the sensor, for example, embodiments 100, 100', 300, 300', 400, 400', 800, 800' and/or 560.

In embodiments of the measuring device 1000, the measuring means 1010 is implemented to measure a transmission characteristic S12, S21 or a reflection characteristic S11, S22 of the sensor.

In embodiments of the measuring device 1000, the measuring means 1010 may comprise a means for generating 1012 an input or reference signal 1013 and input this reference signal at an input port 112 of the sensor, a means 1014 for receiving an output signal 1015 which is output at the output port 114 of the sensor due to the input signal 1013 input to the input port 112, and a means 1016 for determining the measurand based on the input signal 1013 and the output signal 1015.

As explained based on FIG. 5B, and in particular FIG. 5D, the magnitudes of the S-parameters vary with the change of the dielectric characteristics of the first and/or second characteristic or a change in the relation between the first structure and the second structure. Thus, for example, a table with different displacement values in millimeters or micrometers and the respective magnitudes of the S-parameters at the first resonance frequency or other resonance frequencies can be determined and used for determining a value for the measurand for the displacement values. The respective magnitude values can, for example, be stored in a look-up table 1018, which can be used by the means for determining 1016 to determine the measurand based on the measured S-parameter value.

Same can be done for embodiments of the sensors sensing inserted materials based on their specific dielectric characteristic, where for the different materials, gases, fluids or solid materials, the respective magnitudes of the S-parameters are determined a priori and stored, and used for determining which of these materials have been inserted into the holes 536.

Figure 10B:
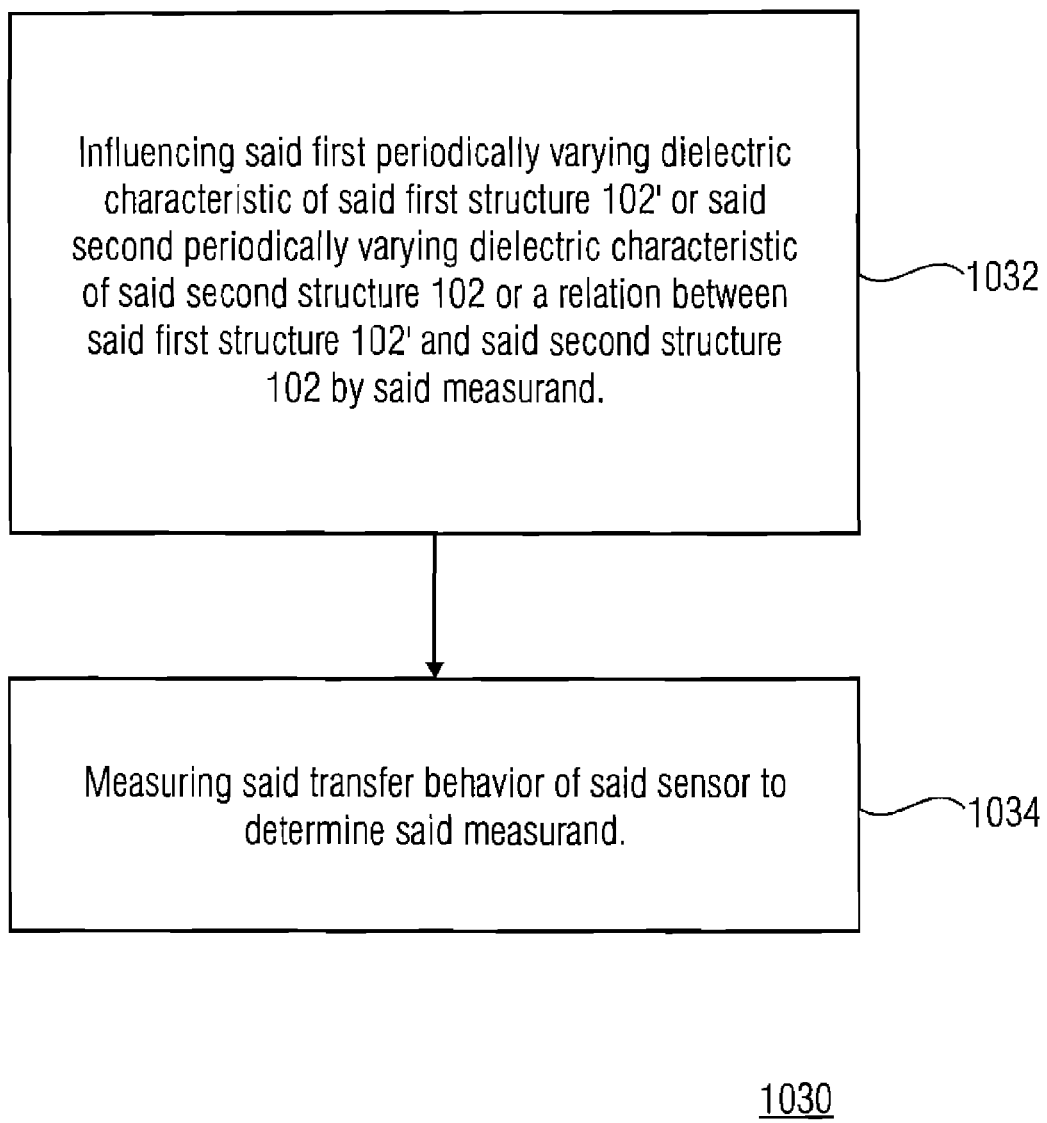
FIG. 10B shows a flowchart of an embodiment of a method for measuring a measurand using a sensor.

FIG. 10B shows a flowchart for an embodiment of a method 1030 for measuring a measurand with a sensor for sensing the measurand. The method comprising the step 1032 the measurand influencing the first periodically varying dielectric characteristic of the first structure 102' or the second periodically varying dielectric characteristic of the second structure 102 or a relation between the first structure 102' and the second structure 102; and step 1034 measuring the transfer behavior of the sensor to determine the measurand.

Figure 11A:
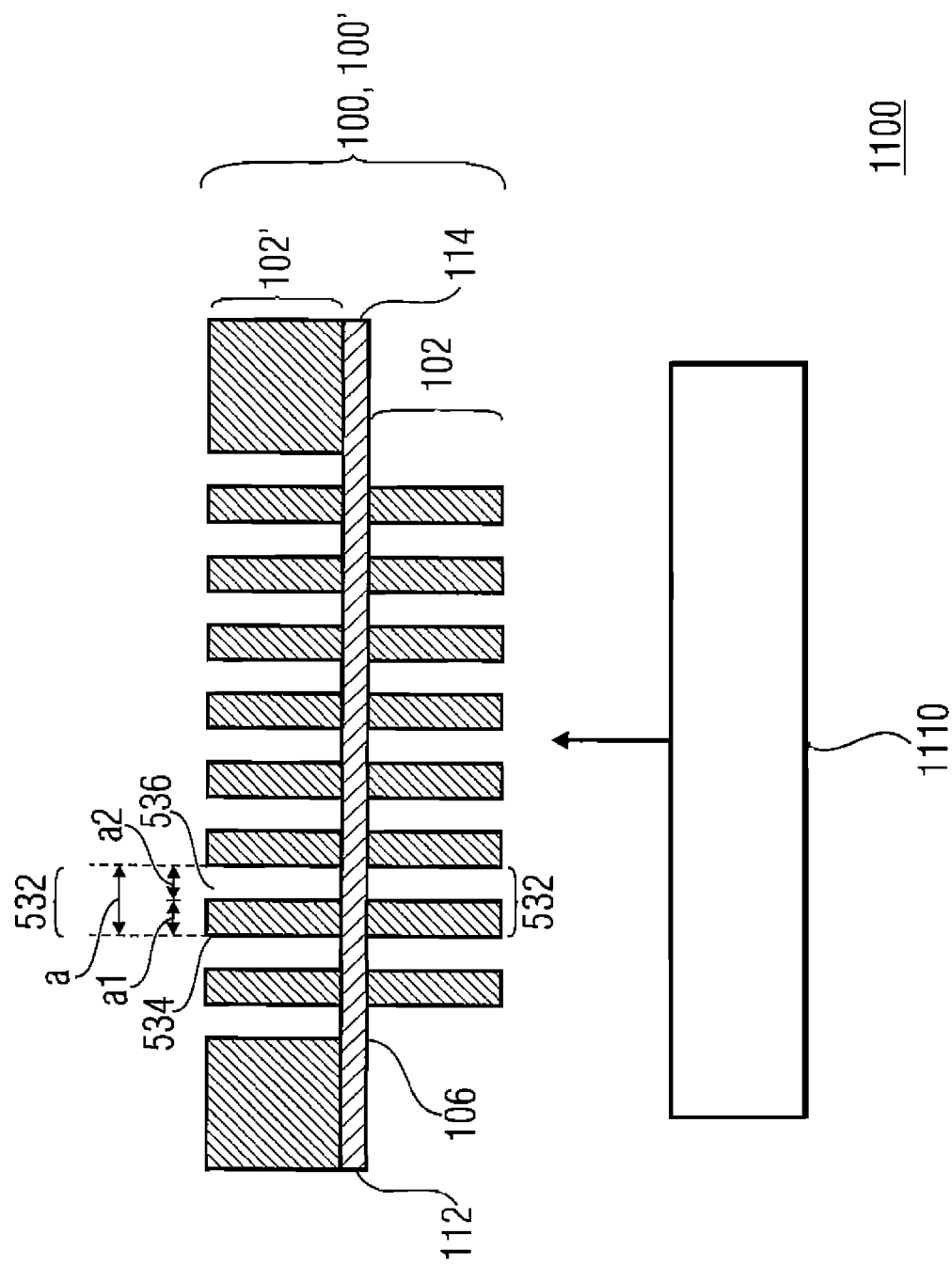
FIG. 11A shows a concept of an embodiment of a filter component.

FIG. 11A shows a schematic view of a filter component 1100 with a structure 100 (fixed first structure 102') or 100' (movable first structure 102'), and a filter control 1110 which is implemented to adapt the first periodically varying dielectric characteristic of the first structure or the second periodically varying dielectric characteristic of the second structure or a relation between the first structure and the second structure, such that the filter component has a predetermined transfer behavior.

In one embodiment, the filter control 1110 is implemented to adapt the first periodically varying dielectric characteristic of the first structure, the second periodically varying dielectric characteristic of the second structure or a relation between the first structure and the second structure such, that the filter component has a predetermined attenuation at the at least one transfer minimum, as shown, for example, in FIG. 5D for the first and second resonance frequency.

Figure 11B:
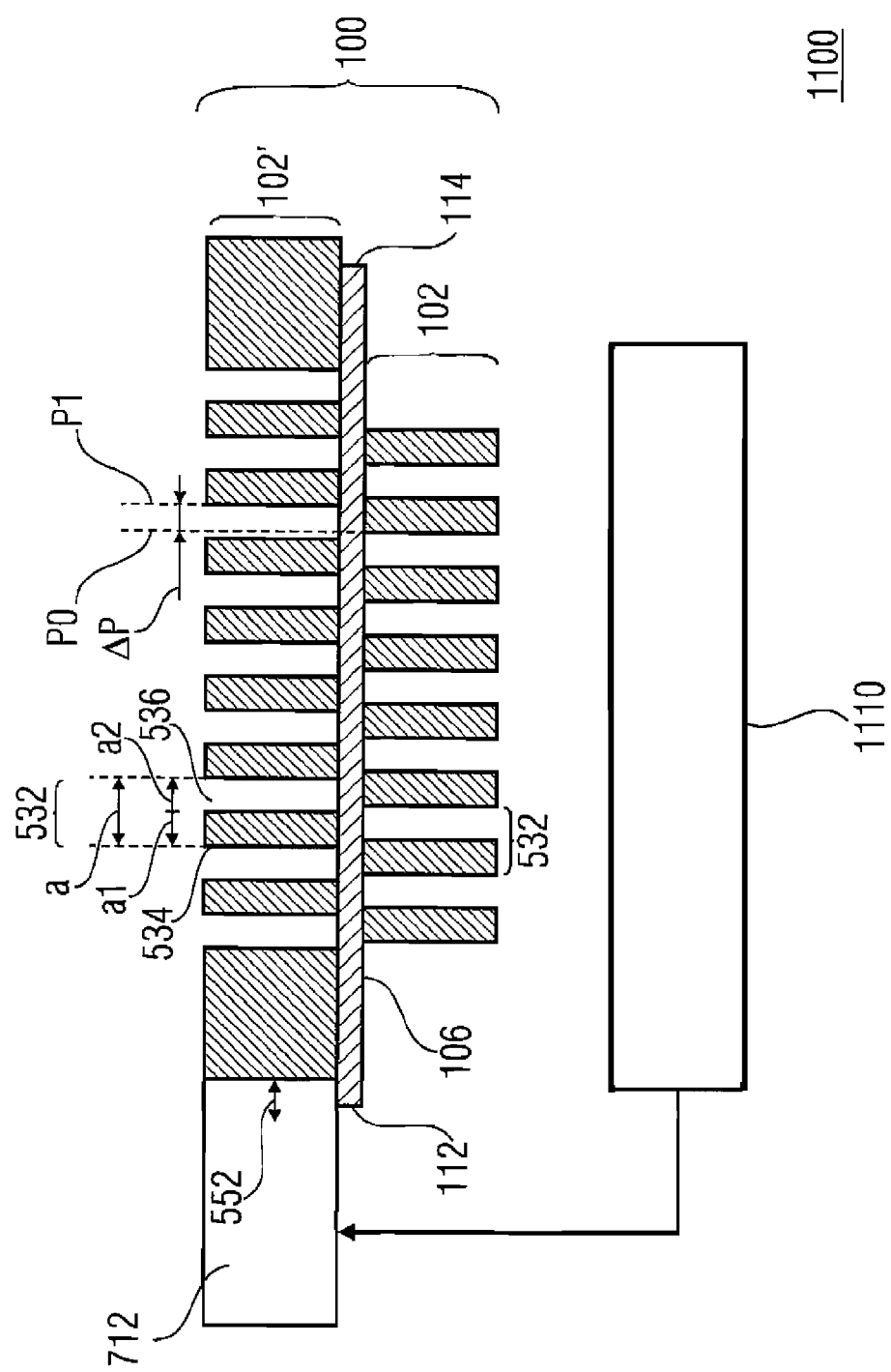
FIG. 11B shows a block diagram of an embodiment of a filter component with an actor for adapting the transfer behavior of the filter component.

FIG. 11B shows a schematic view of an embodiment of an adaptable filter component comprising an actuator 712, wherein the actuator is implemented to adapt the relation between the first structure 102' and the second structure 102. The actuator 712 is be mechanically coupled to the first structure 102', to move the first structure 102' in one or both directions (see arrow 552). The filter control 1110 is implemented to control the actuator 712, e.g., the retraction or expansion of the actuator 712 in one or both directions, and thus controls the transfer behavior or filter characteristic of the filter component.

The actuator 712 can be a piezoelectric actuator, a thermal actuator, or any other actuator causing a displacement of the first structure 102' with regard to the second structure 102 or reference position P0.

In other embodiments, the filter component 1100 may comprise a sensor with a rotatable first structure 102' and an actuator 712 to rotate the first structure 102' with regard to the second structure.

FIG. 12 shows a flowchart of an embodiment of a method 1200 for adjusting a transfer behavior comprising a sensor, the sensor comprising a coplanar waveguide, a first structure 102', and a second structure 102, wherein a unit-cell of the structures 102, 102' with the periodically varying dielectric characteristics is dimensioned such that the filter component has a frequency dependent transfer behavior with at least one transfer minimum. The method comprises adapting 1202 the first periodically varying dielectric characteristic of the first structure 102' or the second periodically varying dielectric characteristic of the second structure 102, or a relation between the first structure 102' and the second structure 102 such that the filter component, e.g., filter component 100, has a predetermined transfer behavior.

Figure 13:
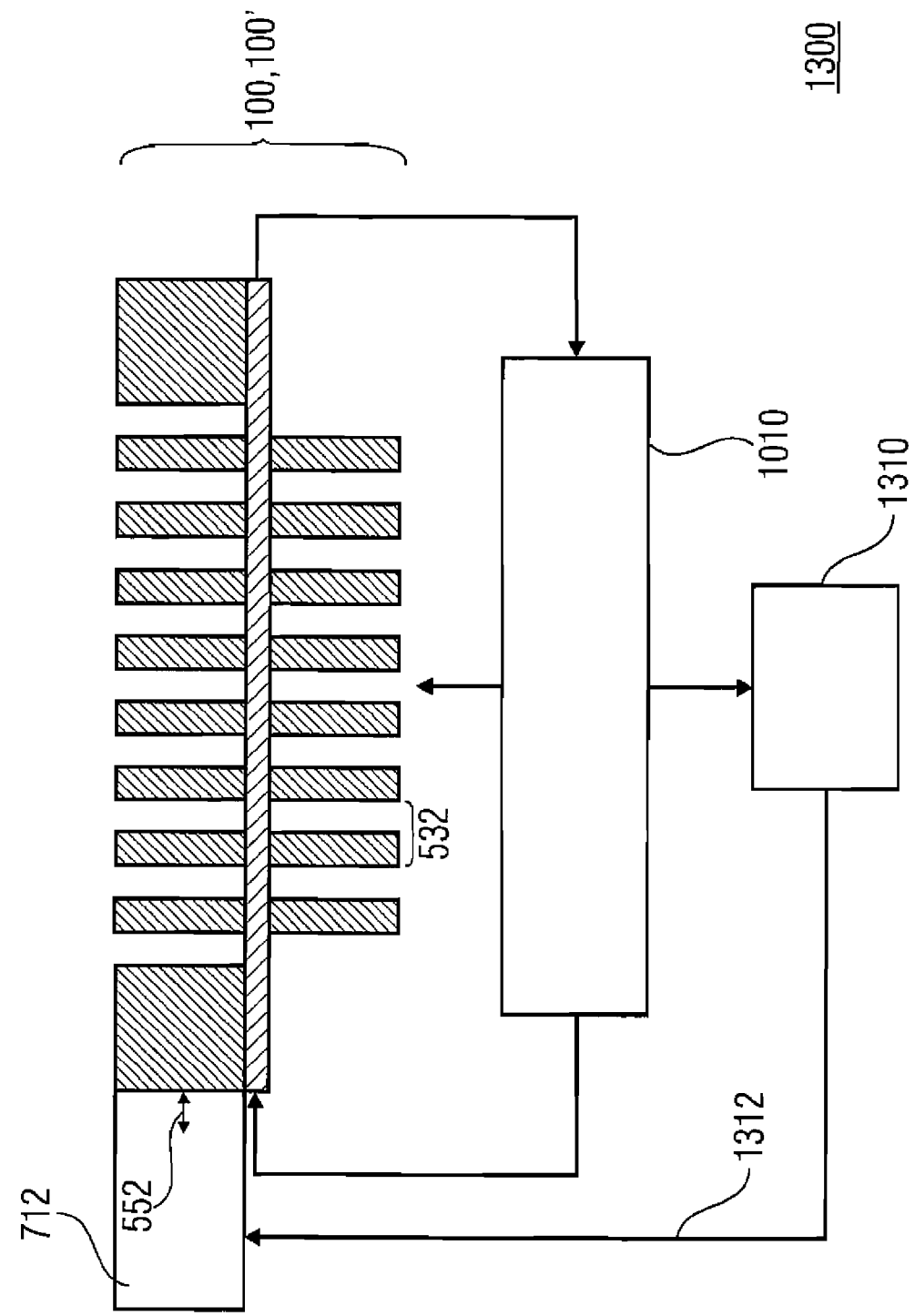
FIG. 13 shows a block diagram of an embodiment of an actuator system.

FIG. 13 shows a schematic view of an embodiment of an actuator system 1300 with a sensor 100, an actuator 712 mechanically coupled to the sensor 100, a measuring means 1010 and a controller 1310. The controller 1310 is implemented to control 1312 the state of the actuator, i.e., the expansion or contraction of the actuator 712, based on the shift caused to the first structure 102' due to the mechanical coupling with the actuator. The measuring means 1010 is implemented to determine a transfer characteristic of the sensor 100. The controller is implemented for comparing a target state with a determined state of the actuator based on the transfer behavior provided by the means for measuring, and for controlling 1312 the actuator 712 such that the predetermined target state is achieved.

FIG. 14 shows a flow chart of a method 1400 for controlling an actuator using a sensor. The method 1400 comprises step 1410 measuring a transfer behavior of the sensor 100 to determine the state of the actuator 712, step 1420 comparing a target state of the actuator 712 with the determined state of the actuator 712; and step 1430 controlling the actuator such that the actuator achieves the target state.

Based on the aforementioned embodiments, a new coplanar electromagnetic band-gap device was proposed, for example, for sensor applications like precision sensing and distance measurement, other sensor applications, but also for filter applications. The electromagnetic band-gap structure is in principle a 1-dimensional Bragg's mirror with a coplanar waveguide to transmit the microwave of frequency signals. Embodiments have been presented and investigated in silicon micro-machining. The sensor/filter component can be used in frequency ranges of radio frequency (RF), microwave and millimeter-wave dependent on the range and accuracy of the distance to be measured. In addition, a structure has been introduced to miniaturize the device and the calculated characteristics of the miniaturized sensor/filter component are very similar to those of the "normal" ones with linear-shape. Since the proposed sensor is small, reliable, and can be integrated on silicon chip and electronic circuits, it is an excellent choice for many applications.

A meander-shape coplanar waveguide was proposed to reduce the sensor/filter component dimensions. It was shown that the miniaturized position sensor/filter component with a meander-shape coplanar waveguide, air-bridges at all transmission line bends can be used to prevent propagation of the odd-mode electromagnetic waves.

Although embodiments have been described using silicon-substrates, other semiconductor substrates can be used in alternative embodiments. Furthermore, although embodiments using silicon nitride or silicon dioxide as thin layer 104 between the substrate 102 and the coplanar waveguide 106 have been described, other insulating and/or dielectric materials can be used in alternative embodiments.

Embodiments of measuring devices and actuator systems have been described primarily based on device embodiment 100, 100', however other embodiments like 300, 300', 400, 400', 800 and 800' can also be used in a similar manner.

Depending on certain implementation requirements of the inventive methods, the inventive methods can be implemented in hardware or in software. The implementation can be performed using a digital storage medium, in particular, a disc, CD or DVD having an electronically readable control signal stored thereon, which cooperates with a programmable computer system such that an embodiment of the inventive method is performed. Generally, an embodiment of the present invention is therefore, a computer program product with a program code stored on a machine-readable carrier, the program code being operative for performing the inventive method when the computer program product runs on the computer. In other words, embodiments of the inventive methods are, therefore, a computer program having a program code for performing at least one of the inventive methods when the computer program runs on a computer.

While the aforegoing has been particularly shown and described with reference to particular embodiments thereof, it should be understood by those skilled in the art that there are other changes in the form and details which may be made without departing from the spirit and scope thereof. It is to be understood that various changes may be made in adapting the different embodiments without departing from the broader concepts disclosed herein, and comprehended by the claims that follow.

What is claimed is:

1. A sensor for sensing a measurand comprising:
  a meander-shaped coplanar waveguide with a first surface and a second surface opposite to the first surface;
  air-bridges at bends of the meander-shaped coplanar waveguide;
  a first structure with a first periodically varying dielectric characteristic, the first structure being arranged on the first surface of the coplanar waveguide; and
  a second structure with a second periodically varying dielectric characteristic, the second structure being arranged on the second surface of the coplanar waveguide,
  wherein a unit-cell of the first and second structures with periodically varying dielectric characteristics is dimensioned such that the sensor has a frequency dependent transfer behavior with at least one transfer minimum, and
  wherein the sensor is implemented such that the measurand influences the first periodically varying dielectric characteristic of the first structure or the second periodically varying dielectric characteristic of the second structure, or a relation between the first structure and the second structure.

2. The sensor according to claim 1, wherein the first structure is shifted translationally with regard to the second structure.

3. The sensor according to claim 2, further comprising an actuator, the actuator being implemented to shift in a manner influenced by the measurand the first structure.

4. The sensor according to claim 2, further comprising means for restoring being implemented to shift the first structure back into a reference position.

5. The sensor according to claim 1, wherein the first structure can be rotated with regard to the second structure.

6. The sensor according to claim 5, further comprising an actuator being implemented to rotate influenced by the measurand the first structure.

7. The sensor according to claim 5, further comprising means for restoring being implemented to rotate the first structure back into a reference position.

8. A method for sensing a measurand using a sensor, the sensor comprising a coplanar waveguide with a first surface and a second surface opposite to the first surface, a first structure with a first periodically varying dielectric characteristic, the first structure being arranged on the first surface of the coplanar waveguide; and a second structure with a second periodically varying dielectric characteristic, the second structure being arranged on the second surface of the coplanar waveguide, wherein a unit-cell of the first and second structures is dimensioned such that the sensor has a frequency dependent transfer behavior with at least one transfer minimum, the method comprising:
  generating an input signal at an input port of the sensor;
  influencing the first periodically varying dielectric characteristic of the first structure or the second periodically varying dielectric characteristic of the second structure or a relation between the first structure and the second structure by the measurand;
  receiving an output signal at an output port of the sensor; and
  determining the measurand based on the input signal and the output signal.

9. A measuring device, comprising:
  a sensor for sensing a measurand, the sensor comprising a coplanar waveguide with a first surface and a second surface opposite the first surface; a first structure with a first periodically varying dielectric characteristic structure being arranged on the first surface of the coplanar waveguide; and a second structure with a second periodically varying dielectric characteristic, the second structure being arranged on the second surface of the coplanar waveguide, wherein a unit-cell of the first and second structures is dimensioned such that the sensor has a frequency dependent transfer behavior with at least one transfer minimum, and wherein the sensor is implemented such that the measurand influences the first periodically varying dielectric characteristic of the first structure or the second periodically varying dielectric characteristic of the second structure or a relation between the first structure and the second structure; and
  a measuring device implemented to measure a transfer behavior of the sensor to determine the measurand, wherein the measuring device comprises a look-up table associating transfer behavior values with measurand values.

10. The measuring device according to claim 9, wherein the measuring device is implemented to measure a transmission or reflection characteristic of the sensor.

11. The measuring device according to claim 9, wherein the measuring device comprises:
means for generating an input signal at an input port of the sensor;
means for receiving an output signal at an output port of the sensor; and
means for determining the measurand based on the input signal and the output signal.

12. A filter component comprising:
a coplanar waveguide with a first surface and a second surface opposite to the first surface;
a first structure with a first periodically varying dielectric characteristic, the first structure being arranged on the first surface of the coplanar waveguide; and
a second structure with a second periodically varying dielectric characteristic, the second structure being arranged on the second surface of coplanar waveguide,
wherein a unit-cell of the first and second structures with the periodically varying dielectric characteristics is dimensioned such that the filter component has a frequency dependent transfer behavior with at least one transfer minimum;
a filter control implemented to adapt the first periodically varying dielectric characteristic of the first structure or the second periodically varying dielectric characteristic of the second structure or a relation between the first structure and the second structure such that the filter component has a predetermined transfer behavior; and
a piezoelectric actuator implemented to adapt the relation between the first structure and the second structure, the actuator being mechanically coupled to the first structure or the second structure and the actuator being controlled by the filter control.

13. The filter component according to claim 12, wherein the filter control is implemented to adapt the first periodically varying dielectric characteristic of the first structure or the second periodically varying dielectric characteristic of the second structure or a relation between the first structure and the second structure such that the filter component has predetermined attenuation at the at least one transfer minimum.

14. The filter component according to claim 12, wherein the actuator is implemented to shift translational the first structure with regard to the second structure, such that the filter component has the predetermined transfer behavior.

15. The filter component according to claim 12, wherein the actuator is implemented to rotate the first structure with regard to the second structure such that the filter component has the predetermined transfer behavior.

16. A method for adapting a transfer behavior of a filter component, the filter component comprising a coplanar waveguide with a first surface and a second surface opposite to first surface; a first structure with a first periodically varying dielectric characteristic, the first structure being arranged on the first surface of the coplanar waveguide; and a second structure with a second periodically varying dielectric characteristic so that second structure being arranged on the second surface of coplanar waveguide, wherein a unit-cell of the first and second structures is dimensioned such that the filter component has a frequency dependent transfer behavior with at least one transfer minimum; the method comprising:

adapting the first periodically varying dielectric characteristic of the first structure or the second periodically varying dielectric characteristic of the second structure or a relation between the first structure and the second structure such that the filter component has a predetermined transfer behavior, wherein the adapting is based on a look-up table associating transfer behavior values with first dielectric characteristic, second dielectric characteristic and/or first and second structure relation values.

17. An actuator system, comprising:
a piezoelectric actuator;
a sensor for sensing a state of the piezoelectric actuator, the sensor comprising a coplanar waveguide with a first surface and a second surface opposite to the first surface; a first structure with a first periodically varying dielectric characteristic, the first structure being arranged on the first surface of the coplanar waveguide; and a second structure with a second periodically varying dielectric characteristic, the second structure being arranged on the second surface of the coplanar waveguide, wherein a unit-cell of a period of the first and second structures with the periodically varying dielectric characteristics is dimensioned such that the sensor has a frequency dependent transfer behavior with at least one transfer minimum, and wherein the sensor is implemented such that the state of the piezoelectric actuator influences the first periodically varying dielectric characteristic of the first structure or the second periodically varying dielectric characteristic of the second structure, or a relation between the first structure and the second structure;
a measuring means for measuring a transfer behavior of the sensor to determine the state of the piezoelectric actuator; and
a controller for comparing a target state of the piezoelectric actuator with the determined state of the piezoelectric actuator and for controlling the piezoelectric actuator to achieve the target state.

18. The actuator system according to claim 17, wherein the actuator is mechanically coupled to the first structure or the second structure and implemented such that the state of the actuator influences a relation between the first structure and the second structure.

19. A method for controlling a piezoelectric actuator using a sensor for sensing a state of the piezoelectric actuator, the sensor comprising a coplanar waveguide with a first surface and a second surface opposite to the first surface; a first structure with a first periodically varying dielectric characteristic, the first structure being arranged on the first surface of the coplanar waveguide; and a second structure with a second periodically varying dielectric characteristic, the second structure being arranged on the second surface of the coplanar waveguide, wherein a unit-cell of a period of the first and second structures is dimensioned such that the sensor has a frequency dependent transfer behavior with at least one transfer minimum, and wherein the sensor is implemented such that the state of the piezoelectric actuator influences the first periodically varying dielectric characteristic of the first structure or the second periodically varying dielectric characteristic of the second structure, or a relation between the first structure and the second structure, the method comprising:
measuring a transfer behavior of the sensor to determine the state of the piezoelectric actuator;
comparing a target state of the piezoelectric actuator with the determined state of the piezoelectric actuator; and
controlling the piezoelectric actuator such that the piezoelectric actuator achieves the target state.

* * * * *